US011784407B2

(12) United States Patent
Ito et al.

(10) Patent No.: US 11,784,407 B2
(45) Date of Patent: Oct. 10, 2023

(54) BEACON NETWORK, MOVING-OBJECT POSITIONING SYSTEM, AND LOGISTICS MANAGEMENT SYSTEM

(71) Applicant: Nidec Corporation, Kyoto (JP)

(72) Inventors: Junji Ito, Kyoto (JP); Tomohiko Tomogane, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 596 days.

(21) Appl. No.: 16/764,423

(22) PCT Filed: Nov. 5, 2018

(86) PCT No.: PCT/JP2018/040978
§ 371 (c)(1),
(2) Date: May 15, 2020

(87) PCT Pub. No.: WO2019/098068
PCT Pub. Date: May 23, 2019

(65) Prior Publication Data
US 2020/0358180 A1 Nov. 12, 2020

(30) Foreign Application Priority Data

Nov. 17, 2017 (JP) ................. 2017-221757

(51) Int. Cl.
*H01Q 3/26* (2006.01)
*H04W 4/80* (2018.01)

(52) U.S. Cl.
CPC ........... *H01Q 3/2635* (2013.01); *H01Q 3/267* (2013.01); *H01Q 3/2647* (2013.01); *H01Q 3/2652* (2013.01); *H04W 4/80* (2018.02)

(58) Field of Classification Search
CPC .. H01Q 3/2635; H01Q 3/2647; H01Q 3/2652; H01Q 3/267
USPC .................. 343/754; 342/384, 386, 464, 174
See application file for complete search history.

(56) References Cited

U.S. PATENT DOCUMENTS

2006/0001585 A1* 1/2006 Saito ........................ G01S 3/14
343/754

FOREIGN PATENT DOCUMENTS

| JP | 2007-019828 A | 1/2007 |
| JP | 2008-290859 A | 12/2008 |
| JP | 2009-012912 A | 1/2009 |
| JP | 2013-067207 A | 4/2013 |
| JP | 2015-141136 A | 8/2015 |
| JP | 2015-190979 A | 11/2015 |
| JP | 2017-201473 A | 11/2017 |

OTHER PUBLICATIONS

Official Communication issued in International Patent Application No. PCT/JP2018/040978, dated Jan. 29, 2019.
Kataoka et al., "Brushless Motor", U.S. Appl. No. 11/859,950, filed Sep. 24, 2007.

* cited by examiner

*Primary Examiner* — Bo Fan
(74) *Attorney, Agent, or Firm* — KEATING & BENNETT

(57) ABSTRACT

A beacon network includes a plurality of beacons arranged at predetermined positions to periodically or intermittently emit a signal wave including identification information, and a radio wave absorber to adjust an emission angle of the signal wave emitted from at least one of the plurality of beacons.

17 Claims, 17 Drawing Sheets

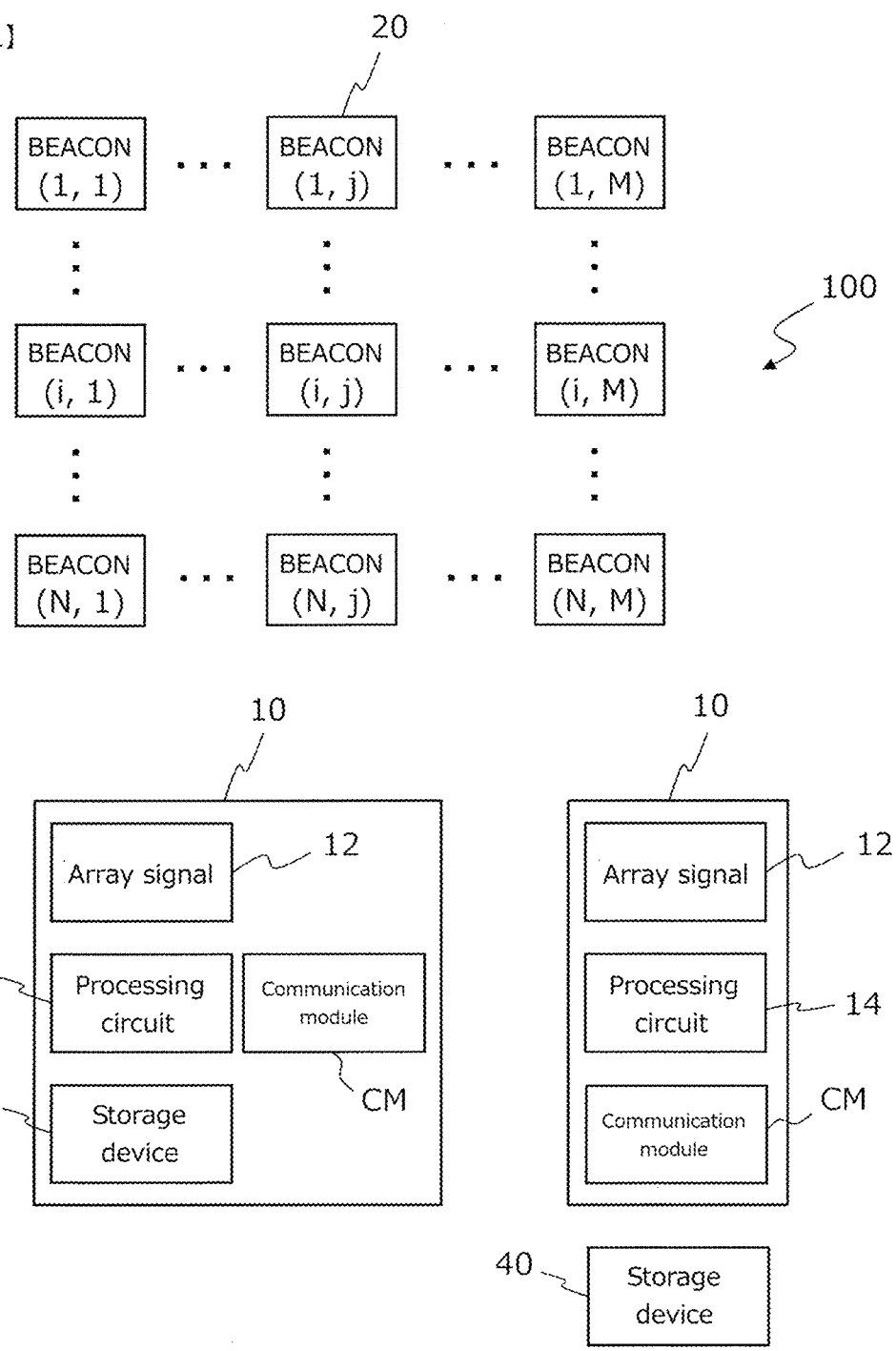

[Fig. 2]
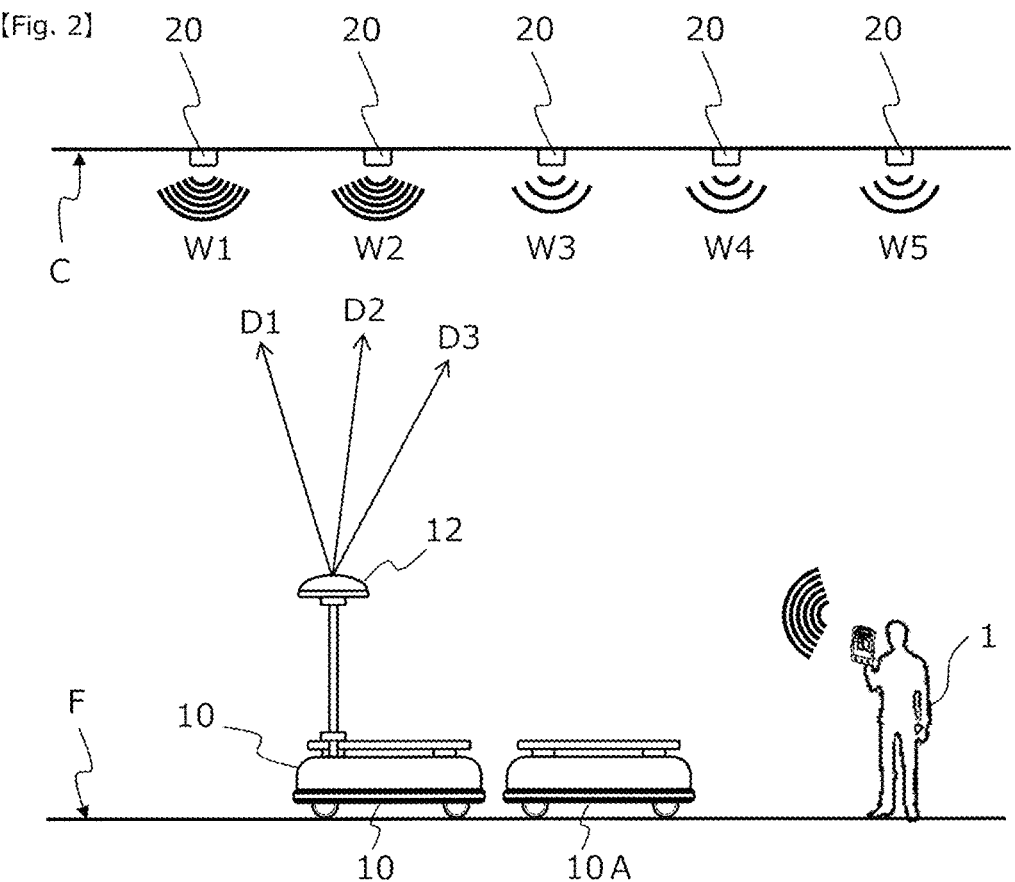
[Fig. 3]
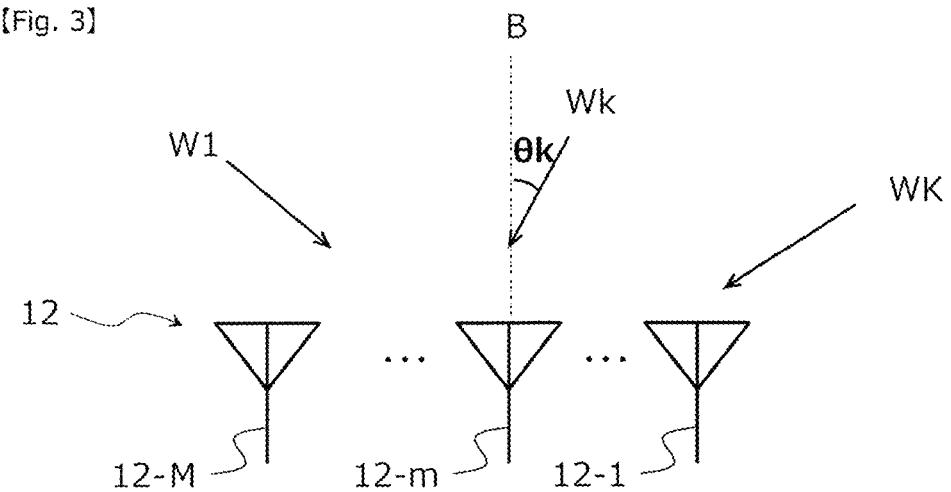

[Fig. 4]
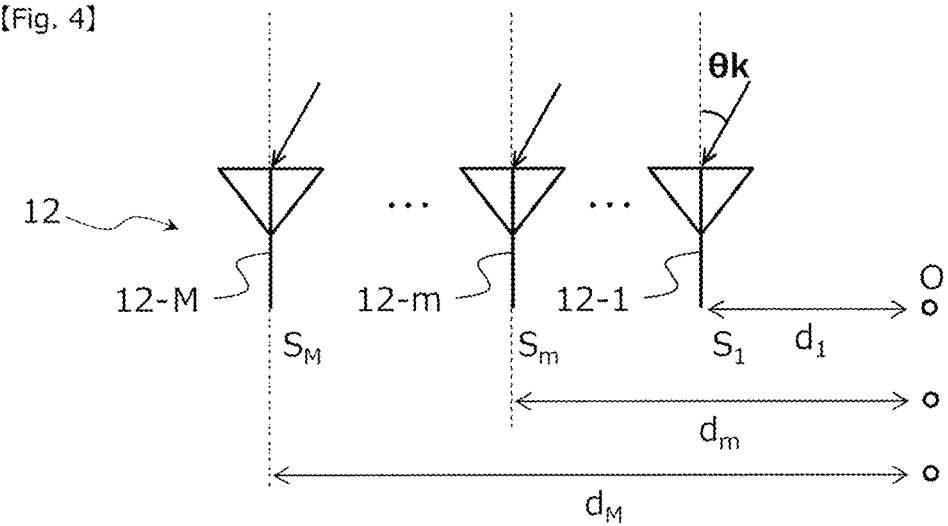

[Fig. 5]
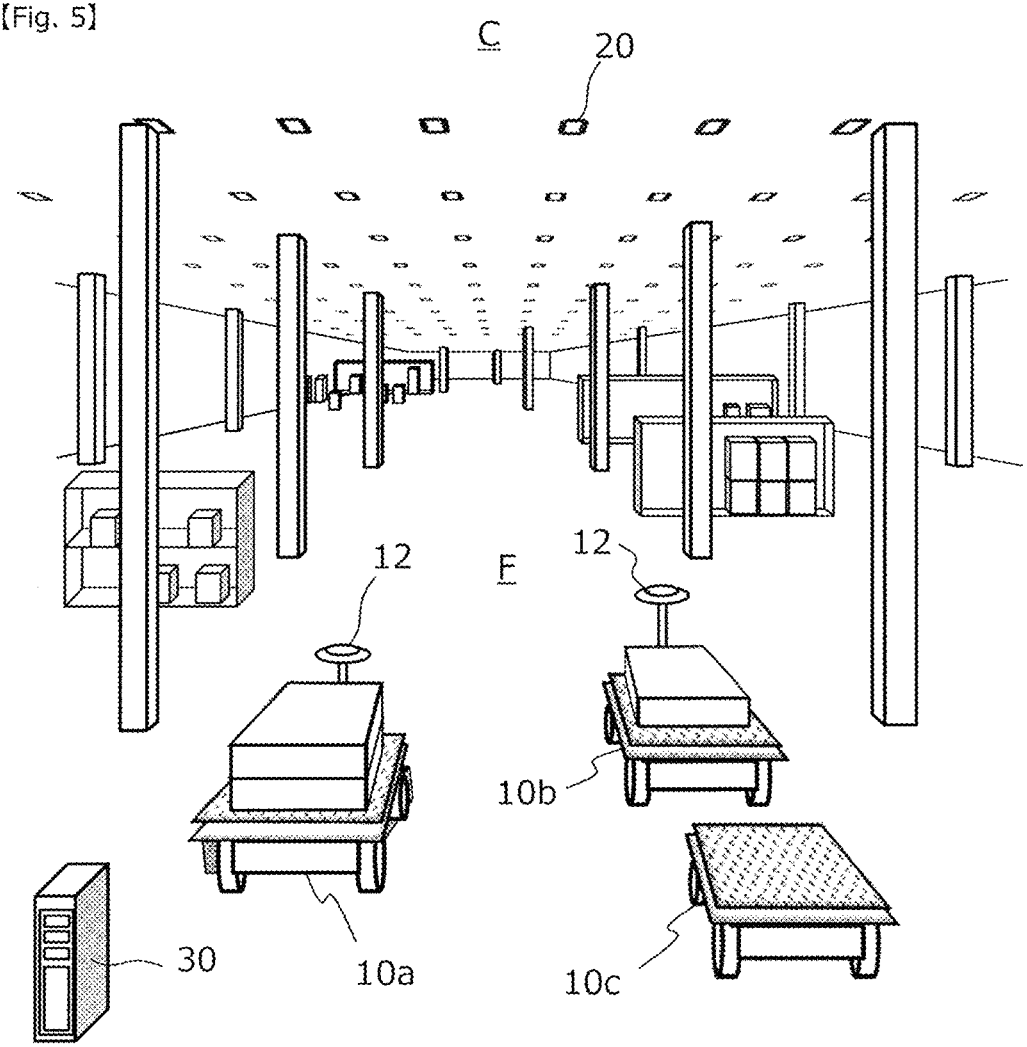

[Fig. 6A]
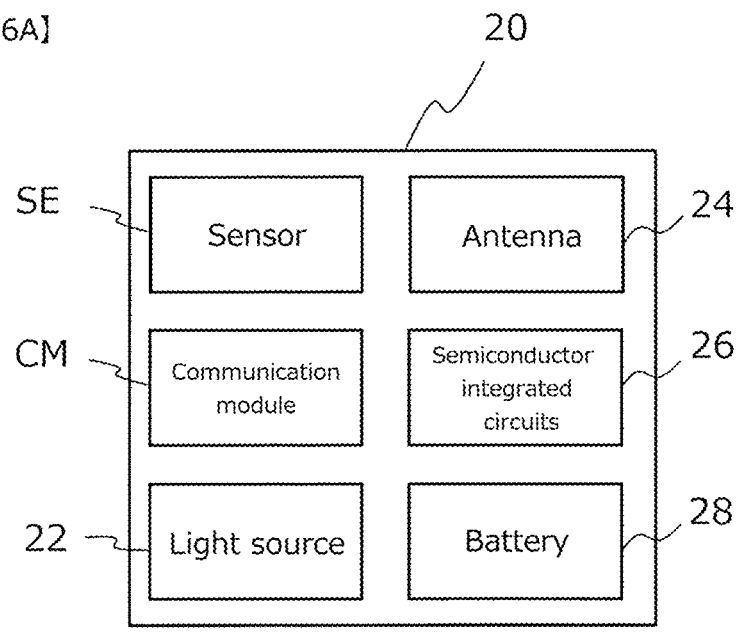
[Fig. 6B]
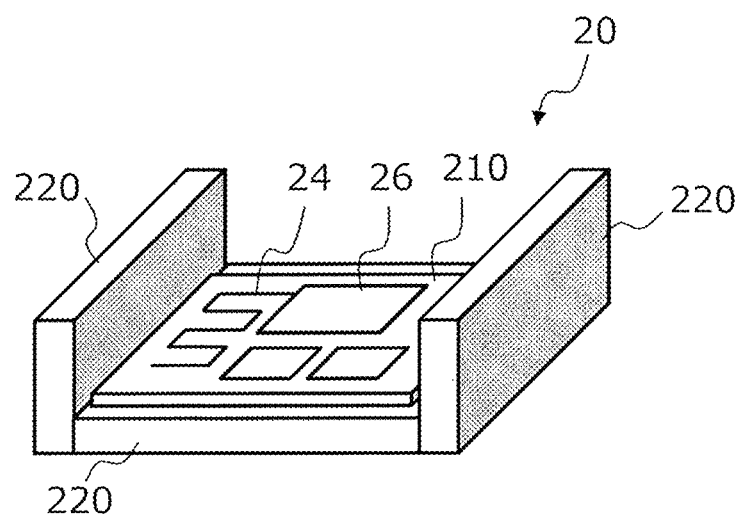

[Fig. 6C]
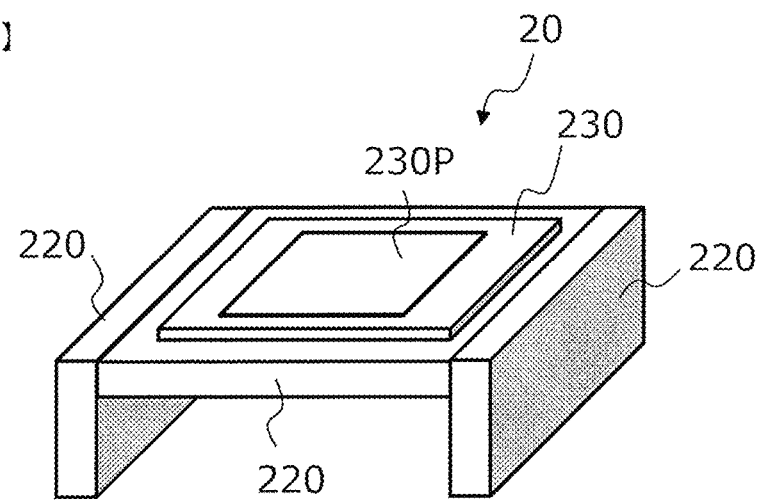
[Fig. 6D]
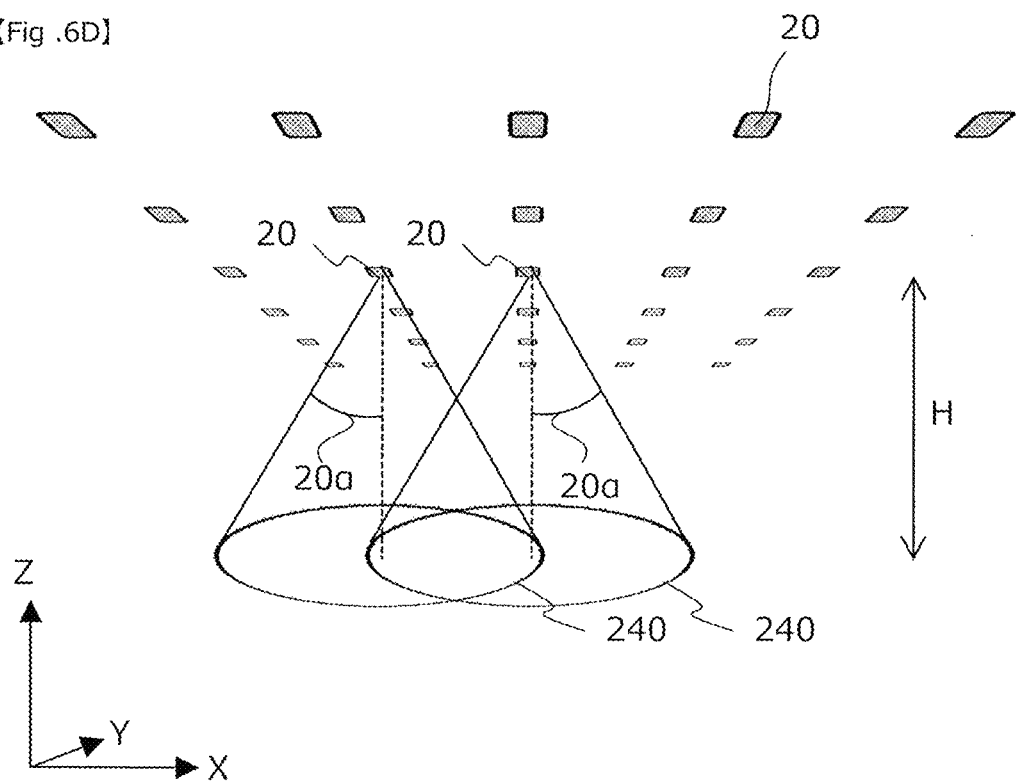

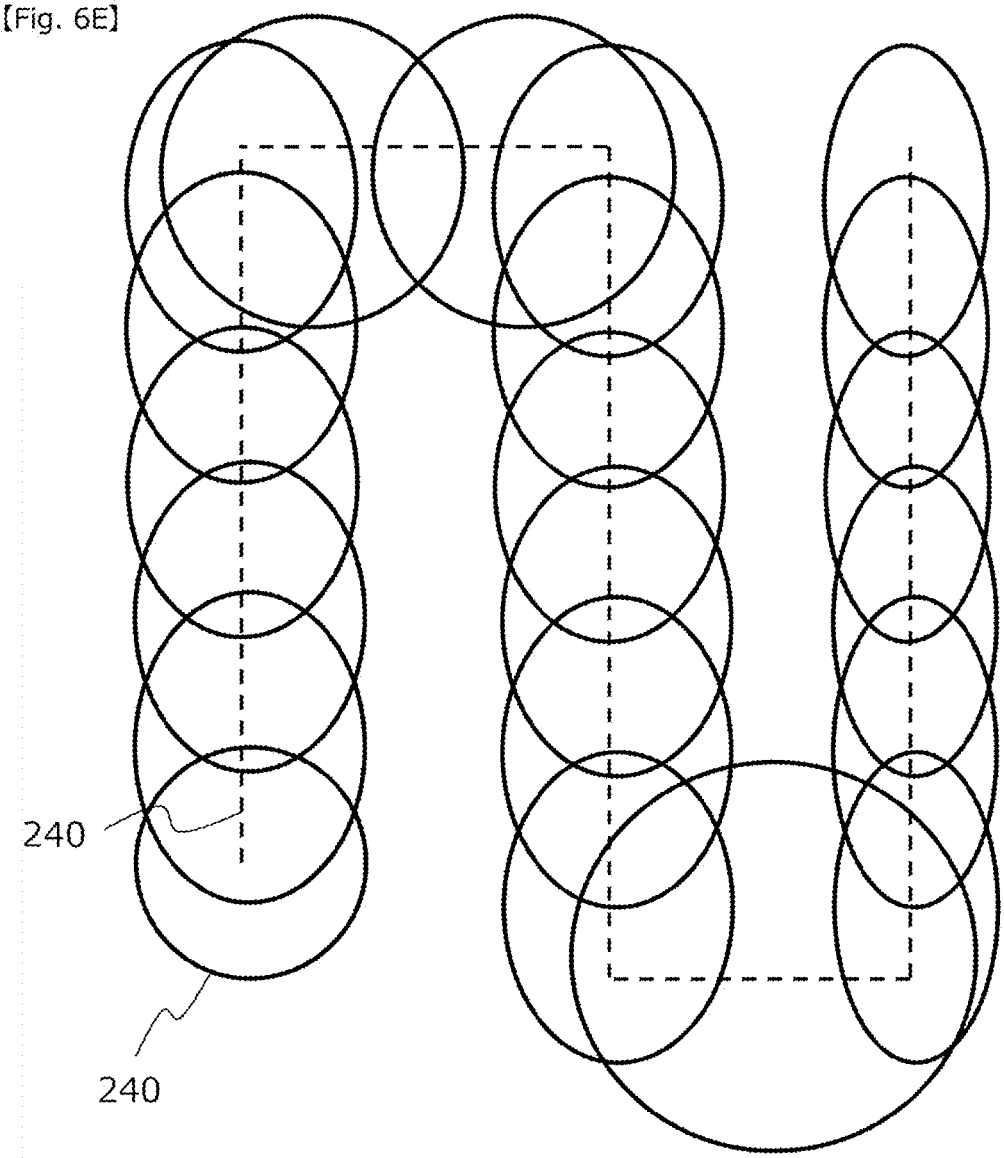
[Fig. 6E]
240
240

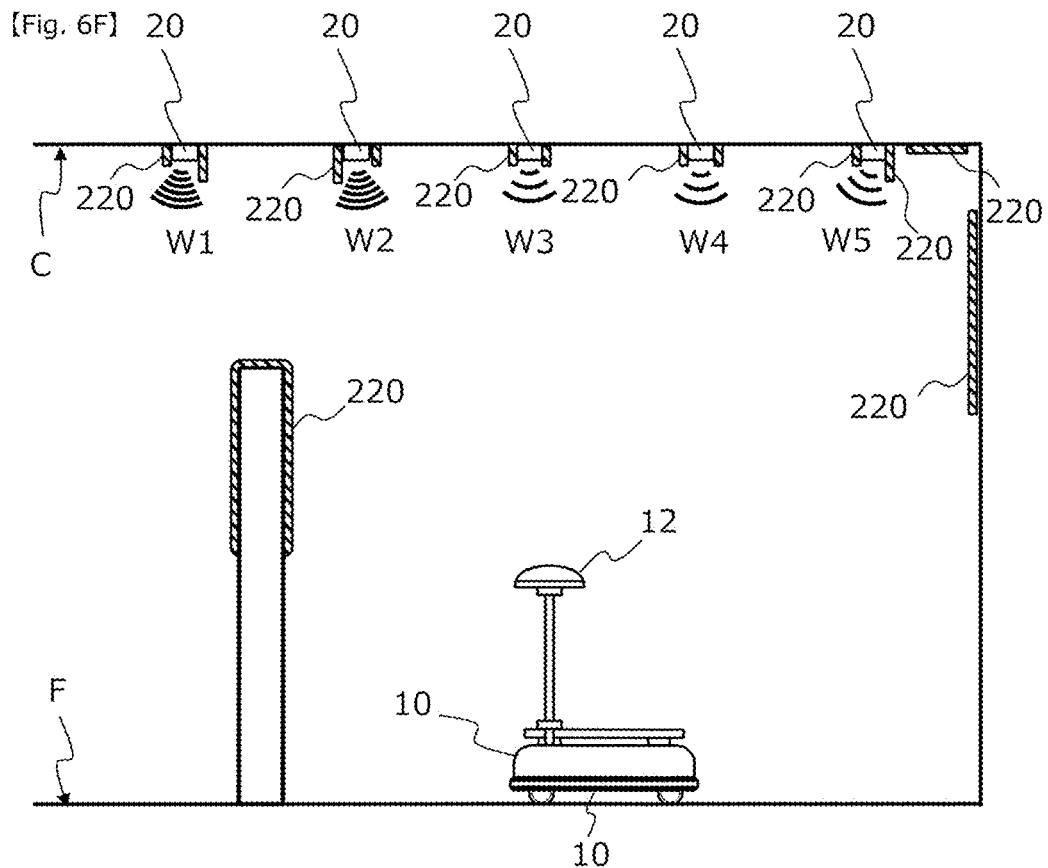
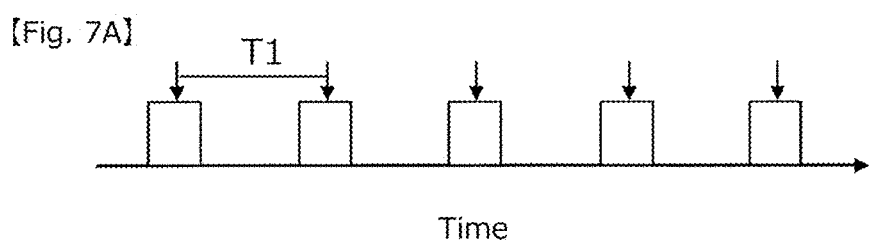
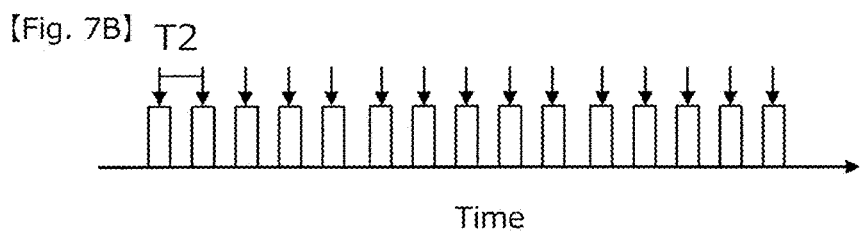

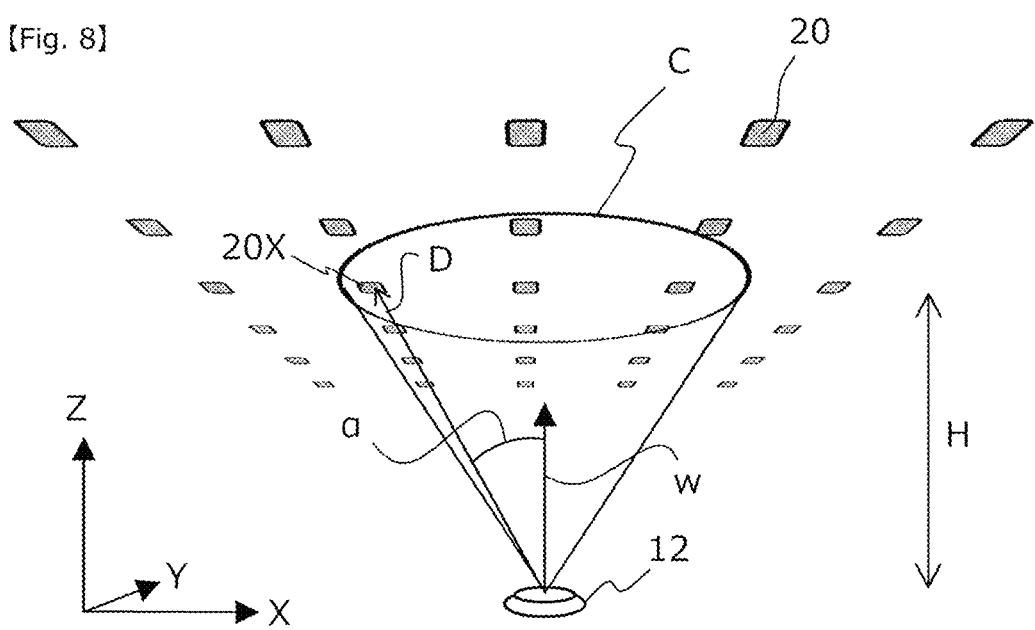
[Fig. 8]

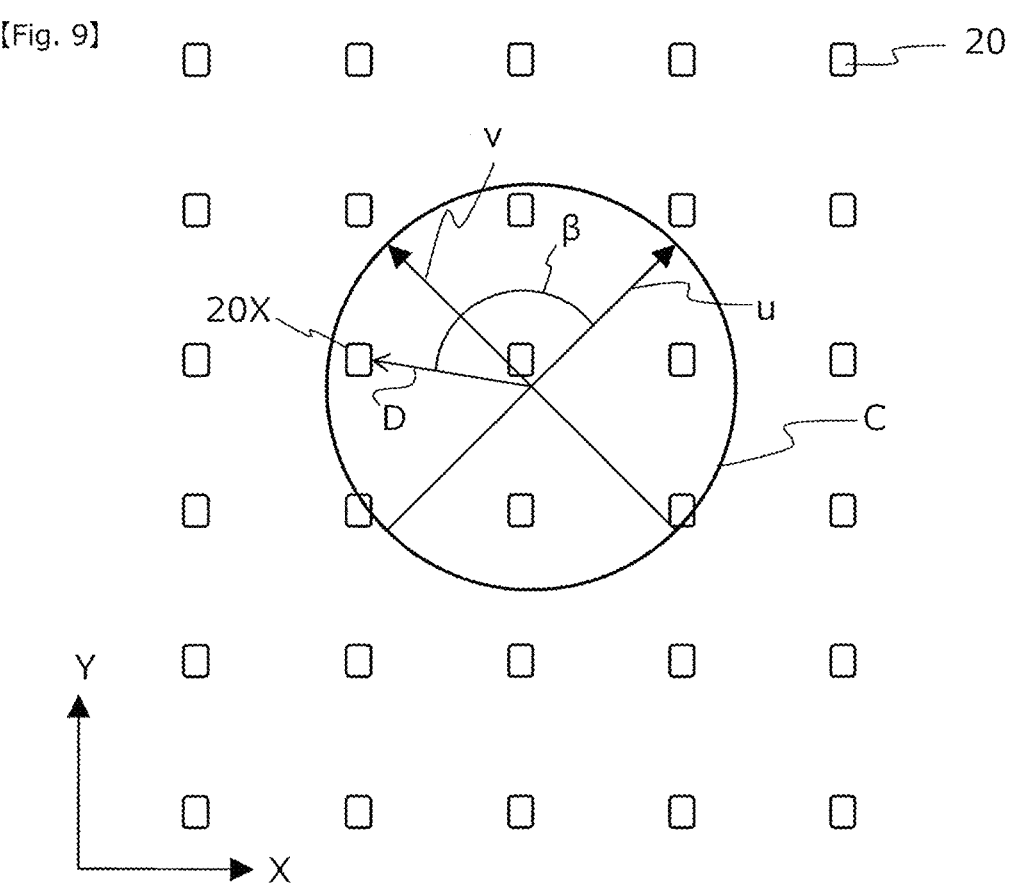
[Fig. 9]

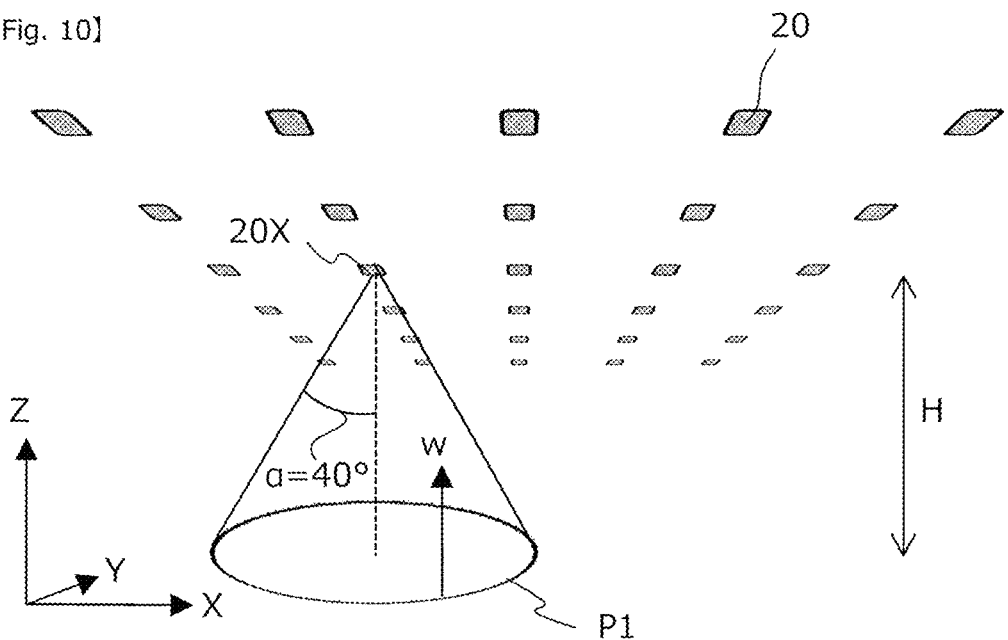
[Fig. 10]
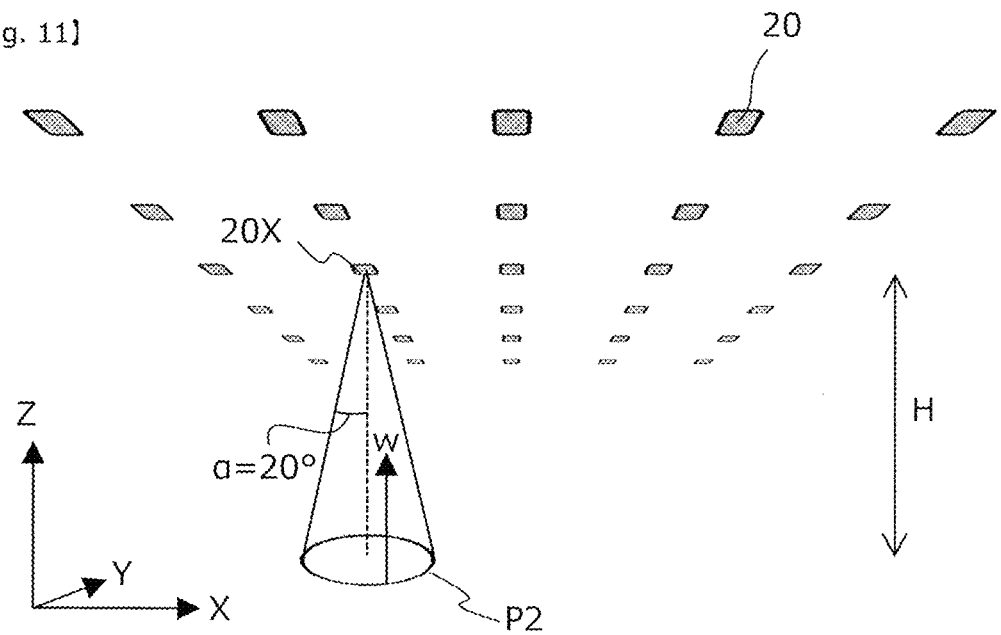
[Fig. 11]

[Fig. 12]
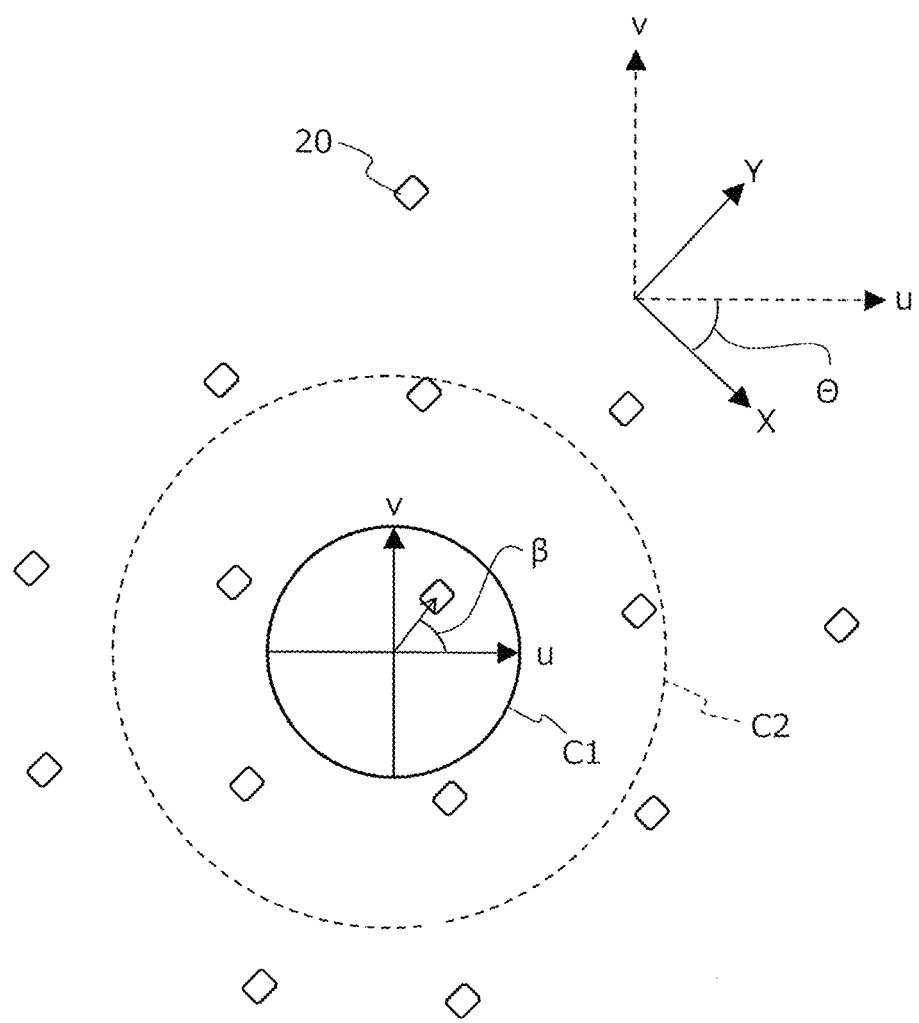

[Fig. 13A]
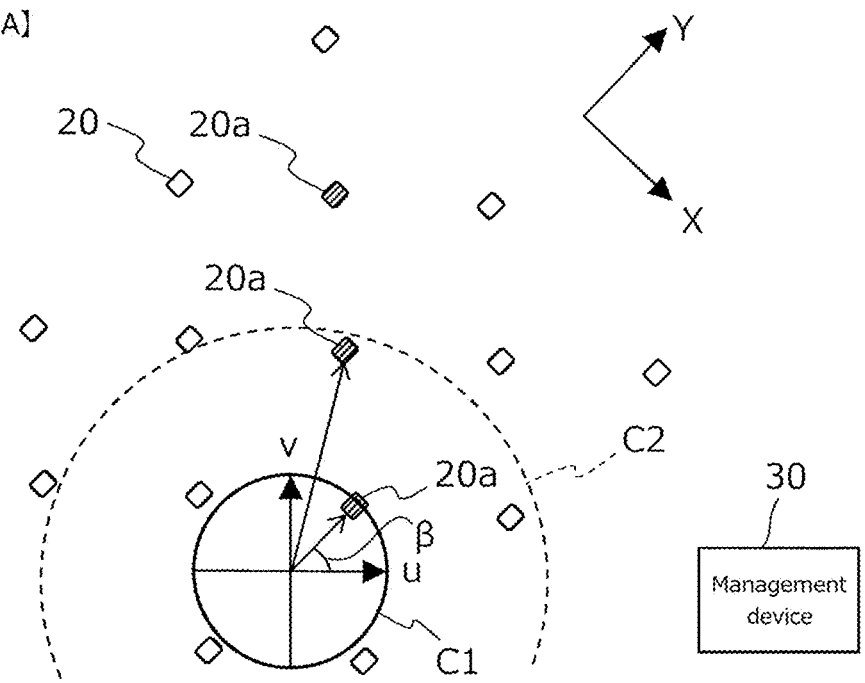
[Fig. 13B]
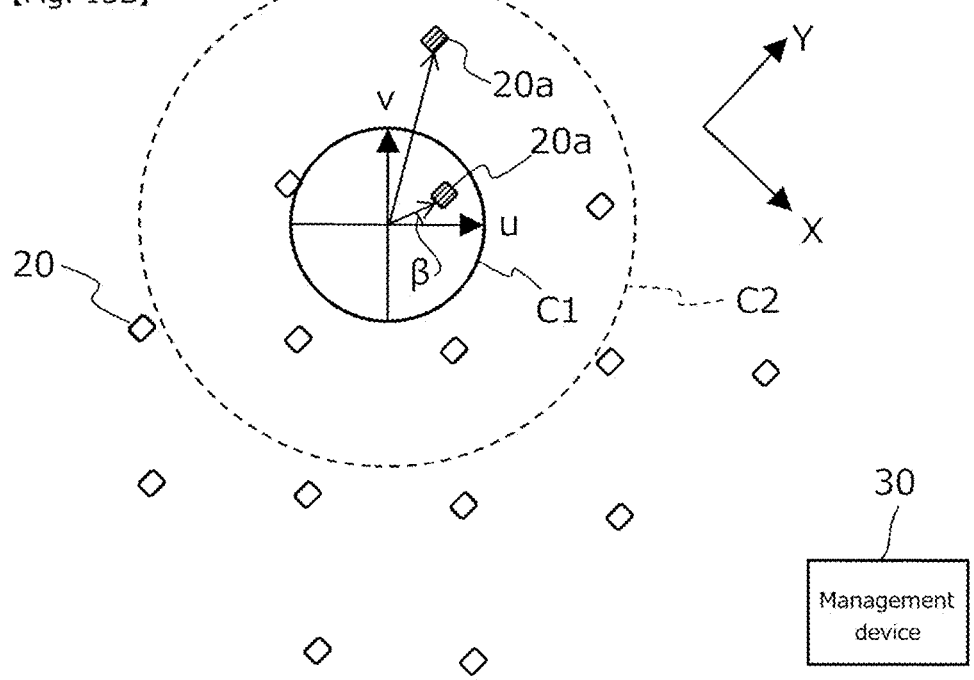

[Fig. 14]
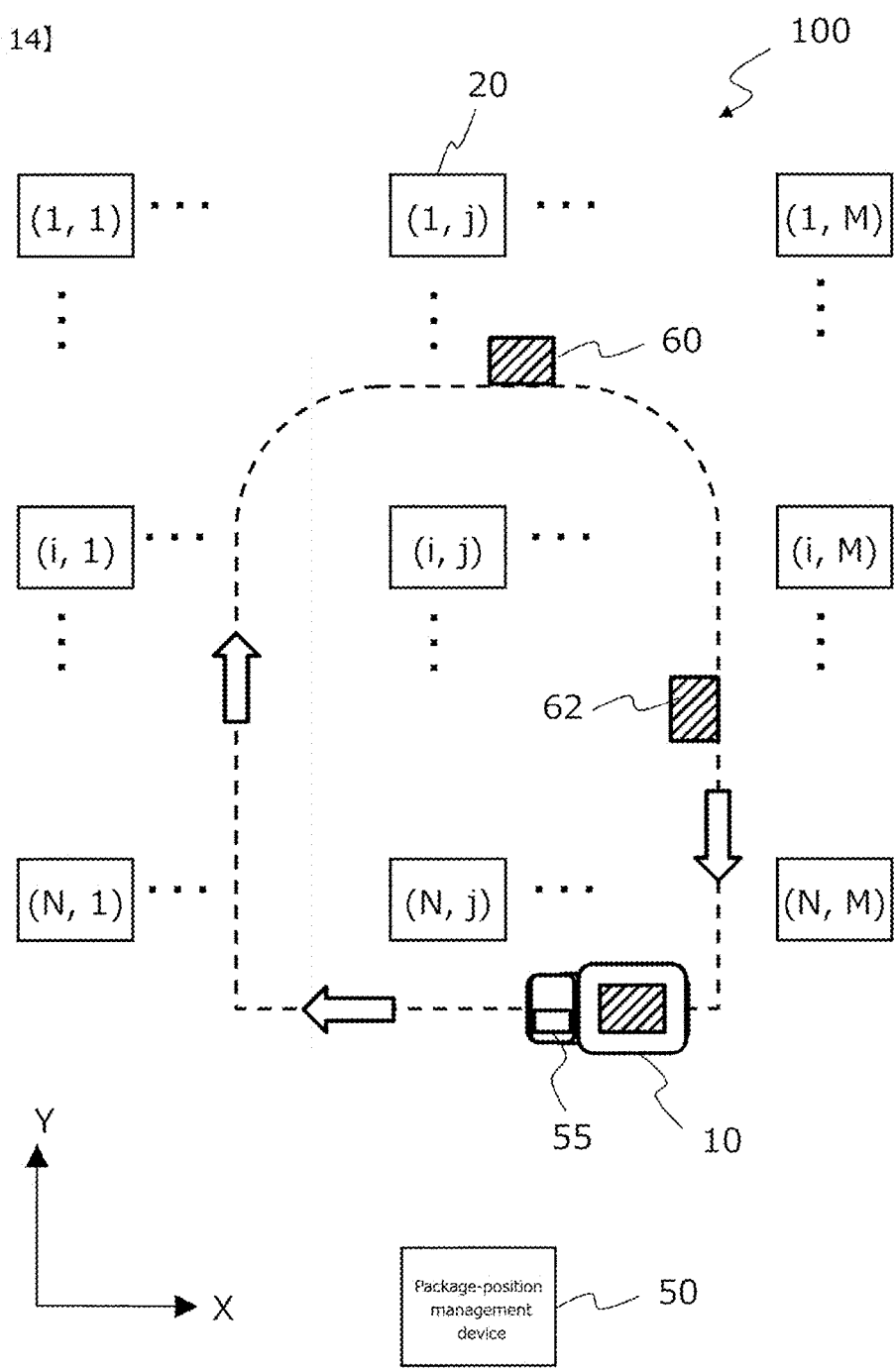

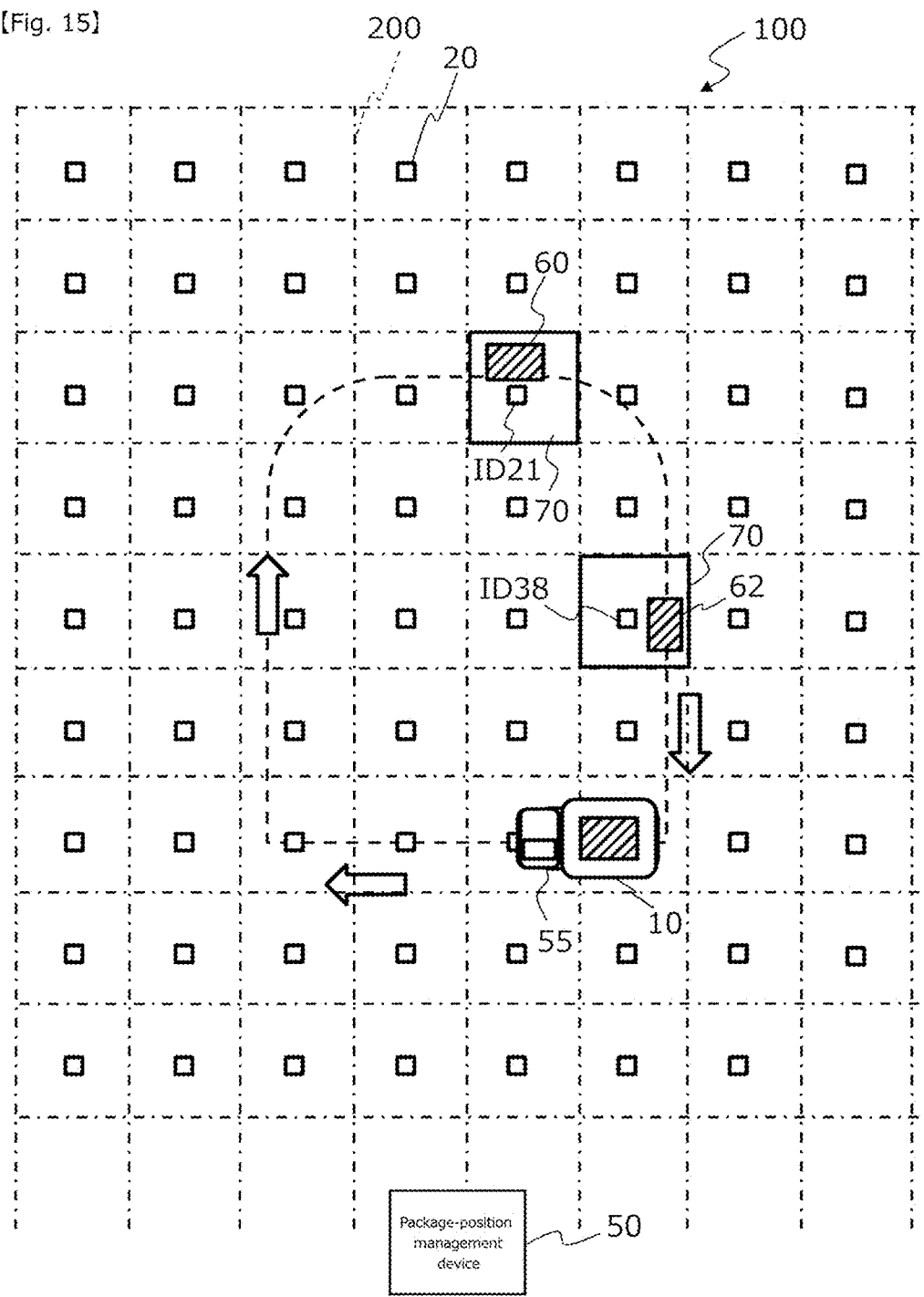
[Fig. 15]

[Fig. 16]
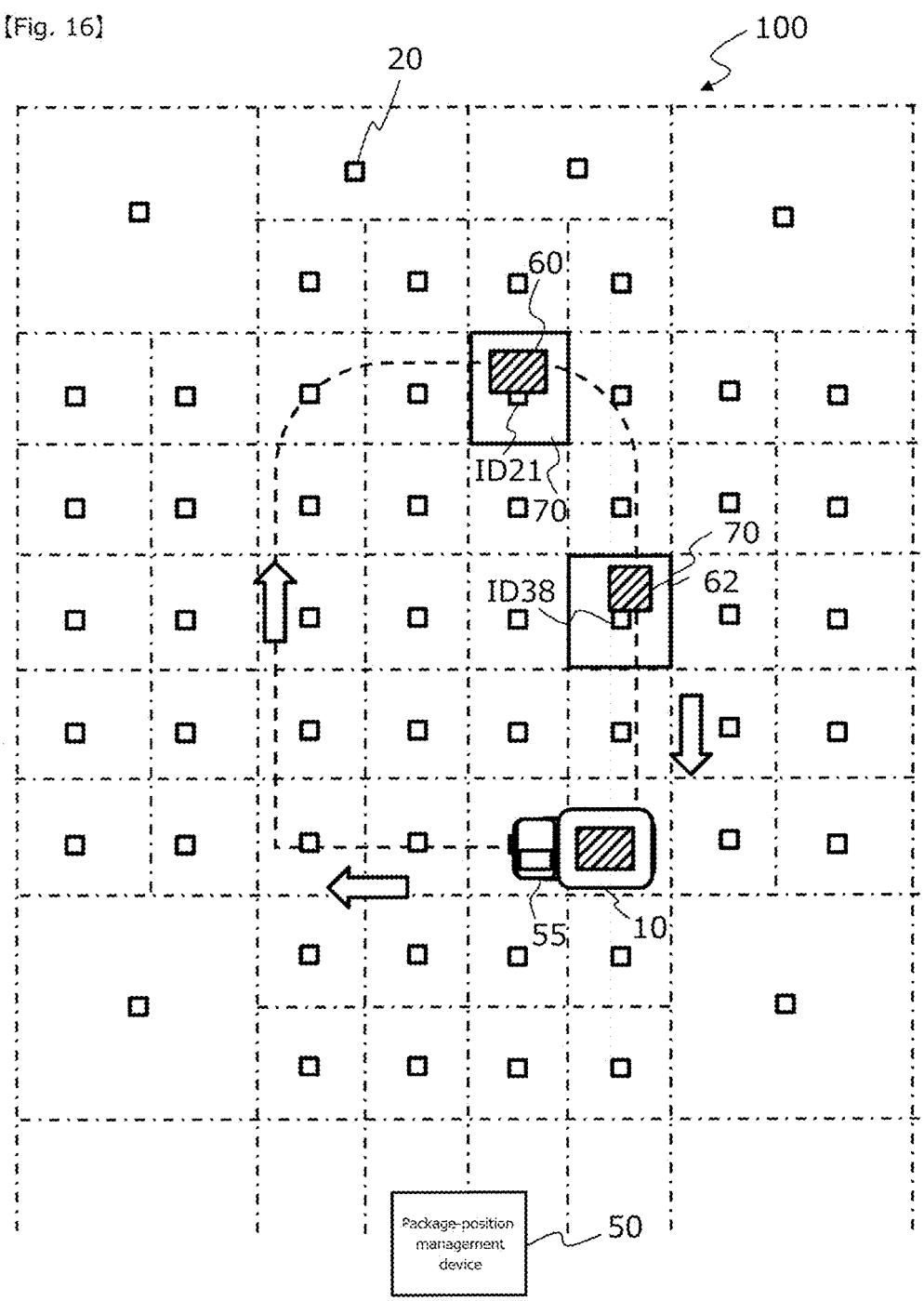

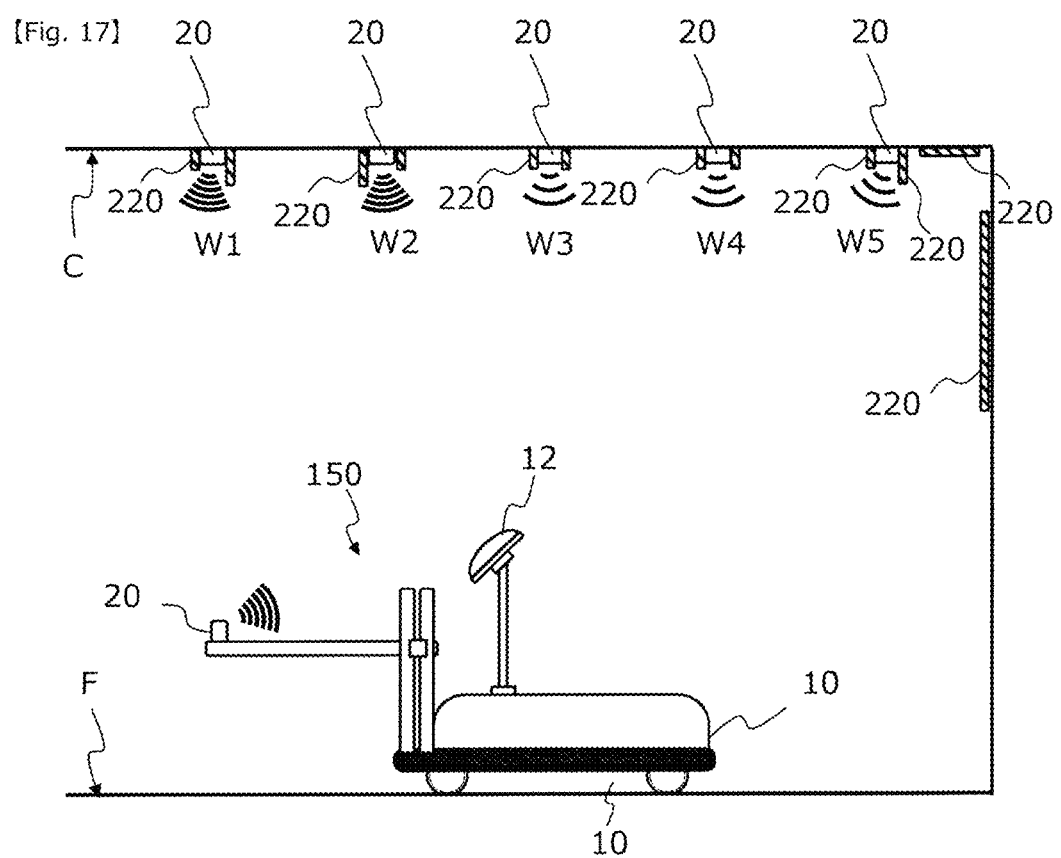

BEACON NETWORK, MOVING-OBJECT POSITIONING SYSTEM, AND LOGISTICS MANAGEMENT SYSTEM

CROSS REFERENCE TO RELATED APPLICATIONS

This is a U.S. national stage of PCT Application No. PCT/JP2018/040978, filed on Nov. 5, 2018, and priority under 35 U.S.C. § 119(a) and 35 U.S.C. § 365(b) is claimed from Japanese Application No. 2017-221757, filed Nov. 17, 2017, the entire disclosures of which are hereby incorporated herein by reference.

1. FIELD OF THE INVENTION

The present disclosure relates to a beacon network, a moving-object positioning system, and a logistics management system.

2. BACKGROUND

Indoor positioning systems configured to estimate the position of a mobile terminal and the like in an indoor environment, where satellite radio waves cannot be received, have been actively developed. For example, in the case where a beacon included in a mobile terminal emits a signal wave, the position of the mobile terminal can be estimated by receiving the signal wave with a plurality of array antennas fixed in the environment.

A single array antenna can estimate the direction of a beacon emitting an electromagnetic wave, that is, an arrival direction from which the signal wave comes. However, a single array antenna cannot obtain the exact distance from the array antenna to the beacon. Accordingly, in order to accurately estimate the position of the beacon, it is necessary to use a plurality of array antennas arranged at different positions and perform geometric calculations from the arrival directions of the signal wave with reference to the array antennas.

There has been known a technique for estimating the direction of an electromagnetic-wave emission source using a single array antenna and displaying the estimated position in an image captured by a camera as a prior art. Such a technique makes it possible to estimate the direction or the position of the radio wave emission source with reference to arrangement of buildings and the like included in the image captured by the camera.

The above conventional technique makes it possible to estimate the direction of the radio wave emission source using an array antenna, but such a conventional art is based on the assumption that the position of the array antenna itself is known.

SUMMARY

In a non-limiting example embodiment of the present disclosure, a beacon network includes a plurality of beacons arranged at predetermined positions to periodically or intermittently emit a signal wave including identification information, and a radio wave absorber to adjust an emission angle of the signal wave emitted from at least one of the plurality of beacons.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a diagram illustrating an example configuration of a moving-object positioning system according to an example embodiment of the present disclosure.

FIG. 2 is a diagram showing an example in which a plurality of beacons are arranged on a ceiling of a building, such as a factory or a warehouse.

FIG. 3 is a diagram showing a relationship between an array antenna having M antenna elements arranged in a straight line and a plurality of signal waves coming from different directions.

FIG. 4 is a diagram schematically showing the array antenna receiving a k-th signal wave.

FIG. 5 is a perspective view schematically showing the inside of a building, such as a warehouse including a large number of beacons arranged on its ceiling.

FIG. 6A is a diagram schematically showing a configuration example of each beacon in an example embodiment of the present disclosure.

FIG. 6B is a perspective view showing a configuration example of the beacon.

FIG. 6C is a perspective view showing the back surface of the beacon shown in FIG. 6B.

FIG. 6D is a perspective view schematically showing a large number of beacons arranged on a ceiling.

FIG. 6E is a plan view schematically showing an arrangement of signal-wave irradiation areas according to an example of a beacon network.

FIG. 6F is a diagram schematically showing an arrangement of radio wave absorbers according to an example of a beacon network.

FIG. 7A is a waveform diagram schematically showing a signal wave emitted at first time-intervals T1 from a beacon operating in a first mode.

FIG. 7B is a waveform diagram schematically showing a signal wave emitted at second time-intervals T2 from a beacon operating in a second mode.

FIG. 8 is a perspective view schematically showing a region C in which the array antenna estimates an arrival direction with relatively high accuracy.

FIG. 9 is a plan view schematically showing the region C in which the array antenna estimates an arrival direction with relatively high accuracy.

FIG. 10 is a diagram schematically showing a circumference P1 in which a moving object may exist when an angle α is 40° in the case where the posture (orientation) of the moving object is unspecified.

FIG. 11 is a diagram schematically showing a circumference P2 in which the moving object may exist when the angle α is 20° in the case where the posture of the moving object is unspecified.

FIG. 12 is a diagram showing an example in which the beacons are arranged at a relatively low density.

FIG. 13A is a diagram schematically showing a state in which operation of the beacon is switched from the first mode to the second mode according to movement of the moving object.

FIG. 13B is a diagram schematically showing a state in which operation of the beacon is switched from the first mode to the second mode according to movement of the moving object.

FIG. 14 is a diagram schematically showing a layout of a warehouse for illustrating an example embodiment of a logistics management system according to the present disclosure.

FIG. 15 is a diagram schematically showing a layout of a warehouse for illustrating another example embodiment of the logistics management system according to the present disclosure.

FIG. 16 is a diagram schematically showing a layout of a warehouse for illustrating still another example embodiment of the logistics management system according to the present disclosure.

FIG. 17 is a schematic diagram illustrating yet another example embodiment of the logistics management system according to the present disclosure.

DETAILED DESCRIPTION

Example embodiments of the present disclosure will be described. Unnecessarily detailed descriptions may be omitted. For example, a detailed description of a well-known matter or a redundant description of substantially the same configuration may be omitted. This is to prevent the following description from being unnecessarily redundant and to facilitate understanding by those skilled in the art. The accompanying drawings and the following description are provided to enable those skilled in the art to fully understand the present disclosure. They are not intended to limit the claimed subject matter.

The present disclosure relates to a beacon network, a moving-object positioning system, and a logistics management system using the moving-object positioning system.

The beacon network of the present disclosure includes: a plurality of beacons 20 arranged at predetermined positions, each of which is configured to periodically or intermittently emit a signal wave including identification information; and a radio wave absorber 220 configured to adjust an emission angle of the signal wave emitted from at least one beacon 20 of the plurality of beacons 20. With this configuration, on the basis of the identification information carried by the signal wave that is periodically or intermittently emitted by each of the plurality of beacons 20, the beacon 20 that has emitted the said signal wave can be identified.

The moving-object positioning system of the present disclosure includes: the beacon network; a moving object 10 including an array antenna 12 and a processing circuit 14; and a storage device 40 configured to store data that associates each of the identification information with a position of corresponding one of the plurality of beacons 20. The array antenna 12 includes a plurality of antenna elements, and is configured to sequentially or simultaneously receive signal waves that have been emitted from the plurality of beacons 20 included in the beacon network, and output array signals from the plurality of antenna elements. The processing circuit 14 is configured to read out the identification information from the signal waves thus received, refer to the data stored in the storage device 40, and determine the position of at least one of the plurality of beacons 20 that have emitted the signal waves based on the identification information, estimate arrival directions of the signal waves thus received based on the array signals, and determine a position of the moving object 10 based on the position of the at least one of the plurality of beacons 20 that have emitted the signal waves and the arrival directions of the signal waves thus estimated. Thus, the configuration of the moving-object positioning system of the present example embodiment can determine the position of the moving object 10 including the array antenna 12 by using at least one of the beacons 20.

An exemplary configuration example of the moving-object positioning system according to an example embodiment of the present disclosure will be described with reference to FIG. 1.

In this example, a moving-object positioning system 100 includes at least one moving object 10 having the array antenna 12 and the processing circuit 14, and the plurality of beacons 20 arranged at predetermined positions, each of which is configured to periodically or intermittently emit a signal wave including identification information. FIG. 1 illustratively shows two moving objects 10. A typical example of the moving object 10 is an automatic guided vehicle, a manned cargo vehicle, a mobile robot, and/or a drone.

In various example embodiments, the plurality of beacons 20 form a beacon network. The beacons 20 may be arranged at grid-point positions on a grid pattern extending along a plane parallel to a floor surface. Since the beacons 20 are arranged at grid-point positions of a grid pattern extending along a plane parallel to a floor surface, a space in which the moving object 10 of interest moves around can be covered with a relatively simple arrangement. The "beacon network" in the present disclosure refers to a group of a plurality of beacons 20 that are arranged to cover a space in which the moving object 10 of interest moves around, and the positions of which are known. Each of the beacons 20 included in the beacon network does not require physical connection with the other beacons 20, and communication between the beacons 20 is not necessary. Each of the beacons 20 included in the beacon network is fixed at a position that enables positioning of the moving object 10. There is no need to dispose the beacons 20 at positions that is not necessary for positioning the moving object 10.

In certain examples, the beacons 20 in the beacon network may be arranged on a ceiling of a building. Installing the beacons 20 on the ceiling of the building does not require a work to provide a plane surface parallel to the floor surface, which leads to a reduction in installation costs. In the example of FIG. 1, N×M beacons 20 (N and M are both positive integers) are arranged at regular intervals in N rows and M columns in a two-dimensional plane. In FIG. 1, the beacons 20 in the i-th row and the j-th column (i and j are integers satisfying 1≤i≤N and 1≤j≤M) are assigned with the reference signs (i, j) in order to distinguish individual beacons 20. The arrangement of the beacons 20 is not limited to a rectangular arrangement of rows and columns. Each beacon 20 can be placed at any position in an area having various shapes.

The moving-object positioning system 100 of the present disclosure includes the storage device 40 configured to store data that associates each of the identification information with the position of corresponding one of the beacons 20. This association can be expressed, for example, by a detailed table showing a relationship of (i, j)=(xi, yi) for all the beacons 20. Here, (xi, yi) is the position coordinates of the beacon (i, j). More specifically, for example, the position of the beacon (3, 2) located in the third row and the second column can be identified as (15, 20) by referring to the above data. Assuming that a reference position on the floor surface is the origin (0, 0), for example, it can be seen that the beacon (3, 2) is located 15 meters due east and 20 meters due north of the origin. Note that, in some cases, it is not necessary to identify the position coordinate values with such accuracy. In other words, the third row and the second column obtained from the identification information read out from the signal wave may be sufficient for locating the beacon 20 emitting the signal wave including the read identification information. In the present disclosure, even in such a case, each identification information is assumed to be associated with the position of corresponding one of the beacons 20.

The storage device 40 may be included in the moving object 10 or may be disposed at a position distant from the moving object 10. The moving object 10 shown on the left side of FIG. 1 includes the storage device 40.

In the illustrated example, the plurality of beacons 20 and the moving objects 10 each have a communication module CM configured to communicate in accordance with the near field communication protocol. This configuration enables the beacons 20 each to emit a signal wave including self identification information, and enables the moving objects 10 to acquire part of the data from the storage device 40 by wireless communication using the communication module CM included in each of the moving objects 10, even when the storage device 40 is located distant from the moving objects 10. That is, the position of the beacon 20 that has emitted the above-described signal wave can be acquired. The part of the data thus acquired is stored in a memory (not shown) provided in each moving object 10.

The processing circuit 14 and the communication module CM can be formed by a single or a plurality of semiconductor integrated circuits. The processing circuit 14 may be referred to as a processor, such as a central processing unit (CPU), or a computer. The processing circuit 14 can be formed by a circuit including a computer, such as a general-purpose microcontroller or a digital signal processor, and a memory incorporating a computer program that causes the computer to execute various instructions (controls the processor). The processing circuit 14 may include a register, a cache memory, and/or a buffer (not shown).

FIG. 2 shows an example in which the plurality of beacons 20 are arranged on a ceiling C of a building, such as a factory or a warehouse. In this example, the moving object 10 travels on a floor F. In the example shown in FIG. 2, signal waves W1, W2, W3, W4, and W5 are emitted from the plurality of beacons 20.

The beacons 20 are also called a tag. In an example embodiment of the present disclosure, the beacons 20 may emit a signal wave in accordance with the Bluetooth (registered trademark) Low Energy (BLE) standard (advertising). Thus, the beacons 20 may be called a BLE beacon or a BLE tag. The beacons 20 may be a device that operates in accordance with another near field communication protocol. The frequency of the signal wave is, for example, a microwave band or a millimeter wave band. The beacons 20 each emit a signal wave in the 2.4 GHz band at time intervals of, for example, 10 milliseconds or more and 10 seconds or less. The frequency of the signal wave needs not be constant, and the signal wave may hop between different frequencies that can be received by the array antenna 12.

The signal wave emitted from each beacon 20 may include extra information in addition to the identification information about the beacon 20. An example of the extra information is the position coordinates of the beacon 20. Each beacon 20 may be electrically connected to various external sensors. In such a case, each beacon 20 can emit a signal wave including various measurement values obtained by these sensors.

As described later, the angle (emission angle) of the signal wave emitted from each beacon 20 in the example embodiments of the present disclosure is adjusted by the radio wave absorber 220. In other words, part of the signal wave that is an electromagnetic wave emitted from the antenna 24 incorporated in each beacon 20 is absorbed by the radio wave absorber 220, and the emission angle of the signal wave is restricted to a specific range. This means that each beacon 20 has directivity. General beacons used for positioning are required to include an omnidirectional antenna to emit an electromagnetic wave having the same strength in all directions to the surroundings. In contrast, each beacon 20 in the example embodiments of the present disclosure is configured to emit the signal wave in a limited direction. The strength of the signal wave emitted from each beacon 20 may vary depending on the direction, since the position estimation in the present disclosure is performed not on the basis of the strength of the signal wave, but on the basis of the arrival direction of the signal wave and the identification information carried by the signal wave.

In the example of FIG. 2, the signal waves W1 to W5 emitted from the beacons 20 may be incident on the array antenna 12 of the moving object 10 at different angles. In the example of FIG. 2, one of the beacons 20 emitting the signal wave W1 exists in the direction of the arrow D1 starting from the center of the array antenna 12. In the same manner, one of the beacons 20 emitting the signal wave W2 and another one of the beacons 20 emitting the signal wave W3 respectively exist in the directions of the arrow D2 and the arrow D3 both of which are starting from the center of the array antenna 12.

In this example, the signal wave W3 from the beacon 20 emitting the signal wave W3 does not reach the array antenna 12 at the position shown in FIG. 2. This is because the emission angle of the signal wave W3 from the beacon 20 is adjusted to be narrowed by the radio wave absorber 220 described above.

When the moving object 10 moves, the relative positions of the beacons 20 vary with respect to the array antenna 12. Accordingly, the directions (angles) of the arrows D1 to D3 pointing the respective beacons 20 from the center of the array antenna 12 vary as the moving object 10 moves. As a result, the signal wave W1 from the beacon 20 emitting the signal wave W1 may become unable to reach the array antenna 12. The array antenna 12 located at the position comes to receive the signal wave W3 from the beacon 20 emitting the signal wave W3. It is desirable that the array antenna 12 of the moving object 10 can directly receive the signal waves from two or three beacons 20 during traveling of the moving object 10. To achieve this, the emission angle of the signal wave from each beacon 20 and the position of each beacon 20 can be determined.

FIG. 2 shows a moving object 10A without the array antenna 12. The moving object 10A may follow the moving object 10 with the array antenna 12 or may be pulled by the moving object 10. In contrast, the moving object 10A without the array antenna 12 may pull or guide the moving object 10 with the array antenna 12. FIG. 2 shows a user 1 holding a wireless terminal. The user can communicate with the moving object 10 and/or the moving object 10A and transmit a travel instruction by using the wireless terminal. The user 1 may directly acquire information indicating the position (self-position) of the moving object 10 measured by the moving object 10 from the moving object 10. A technique to steer the moving object 10 may be freely selected. In the case where the moving object 10 is a forklift, an operator may ride and drive the moving object 10.

With reference to FIGS. 3 and 4, a configuration example of the array antenna 12 and the principle of estimating the arrival direction of the signal wave performed by the processing circuit 14 will be described. The array antenna 12 includes a plurality of antenna elements arranged two-dimensionally (in a plane). The processing circuit 14 may be a computer configured to execute an arrival-direction estimation algorithm to estimate the arrival direction of the signal wave.

For simplicity, the following description focuses on a single row of antenna elements arranged in a straight line among the two-dimensionally arranged antenna elements, and describes a technique of estimating the arrival direction of the signal wave incident on the row of antenna elements.

FIG. 3 shows a relationship between an array antenna 12 having M antenna elements 12-1, ..., 12-m, ..., 12-M arranged in a straight line and a plurality of signal waves Wk coming from different directions. Here, M is an integer of 2 or more, typically 4 or more, and m is an integer of 1 or more and M or less. K is an integer of 1 or more, and k is an integer of 1 or more and K or less. The signal waves Wk are, for example, electromagnetic waves emitted from the beacons 20 arranged on the ceiling C as shown in FIG. 2. In the case where the beacons 20 each emit the signal wave in accordance with the Bluetooth (registered trademark) Low Energy standard, the electromagnetic wave is a microwave that is emitted at predetermined time intervals and is modulated in the form of an advertising packet including identification information.

A plurality of signal waves W1, ..., Wk, ..., WK from various angles are incident on the array antenna 12 simultaneously or sequentially. An incident angle of each signal wave (an angle $\theta_k$ indicating the arrival direction) indicates the angle of the arrival direction with respect to the broadside B of the array antenna 12 (i.e., the direction perpendicular to the plane in which the antenna elements are arranged). The following description focuses on a k-th signal wave Wk. The "k-th signal wave" refers to a signal wave identified by the incident angle $\theta_k$ when K signal waves are incident on the array antenna 12 from the plurality of beacons 20 provided in different directions.

FIG. 4 schematically shows the array antenna 12 receiving the k-th signal wave. In the illustrated example, the array antenna 12 including M antenna elements 12-1, ..., 12-m, ..., 12-M outputs signals (array signals) in response to the signal wave Wk. The array signals can be expressed as Equation 1 as a "vector" having M elements.

$$S=[S_1,S_2,S_M]^T \quad \text{[Equation 1]}$$

$S_m$ (m is an integer of 1 or more and M or less; the same applies hereinafter) is a value of the signal received by the m-th antenna element. The superscript T denotes transpose. S denotes a column vector. The column vector S is given by the product of a direction vector (steering vector or mode vector) determined by the configuration of the array antenna 12 and a complex vector indicating a wave source (signal source), i.e., the signal wave of the beacon 20. When the number of the wave sources is K, the waves of the signals reaching each of the antenna elements from the wave sources are linearly superimposed. Here, $S_m$ can be expressed as in Equation 2.

$$s_m = \sum_{k=1}^{K} a_k \exp\left\{j\left(\frac{2\pi}{\lambda}d_m \sin\theta_k + \varphi_k\right)\right\} \quad \text{[Equation 2]}$$

In Equation 2, $a_k$, $\theta_k$, and $\varphi_k$ respectively denote an amplitude, an incident angle (an angle indicating the arrival direction), and an initial phase of the k-th signal wave. $\lambda$ is a wavelength of the incoming wave, and j is an imaginary unit.

As understood from Expression 2, $S_m$ is expressed as a complex number including a real part (Re) and an imaginary part (Im). An array signal X can be expressed as Equation 3, which is further generalized in consideration of noise (internal noise or thermal noise).

$$X=S+N \quad \text{[Equation 3]}$$

N is vector representation of the noise. The processing circuit 14 obtains an autocorrelation matrix $R_{xx}$ (Equation 4) of the incoming wave using the array signal X shown in Expression 3.

$$R_{xx} = XX^H \quad \text{[Equation 4]}$$
$$= \begin{bmatrix} Rxx_{11} & \cdots & Rxx_{1M} \\ \vdots & \ddots & \vdots \\ Rxx_{M1} & \cdots & Rxx_{MM} \end{bmatrix}$$

The superscript H indicates the complex conjugate transpose (Hermitian conjugate) operation. The processing circuit 14 calculates eigenvalues of the autocorrelation matrix $R_{xx}$. Among the obtained eigenvalues, the number of eigenvalues (signal-space eigenvalues) having a value equal to or greater than a value determined by thermal noise corresponds to the number of incoming waves. Then, by calculating the angle at which the likelihood of the arrival direction of each signal wave is maximized (the maximum likelihood), the number and the directions of the beacons 20 that have emitted the received signal waves can be specified. The method of estimating the angles indicating the arrival directions of the signal waves is not limited to this example. The angles can be estimated using various algorithms for arrival-direction estimation.

When a row of antenna elements arranged in a straight line is used, the arrival directions of the wireless signals can be estimated for the direction (first direction) in which a phase difference occurs in the wireless signals incident on the row of antenna elements. However, the arrival directions of the radio signals cannot be estimated for a second direction perpendicular to the first direction. It is necessary to use the antenna elements arranged two-dimensionally (in a plane) to estimate the arrival direction for the second direction. Since techniques for calculating the angles in both the first direction and the second direction using the two-dimensionally arranged antenna elements are well known, detailed description thereof will be omitted.

In the present example embodiment, the diameter of the array antenna 12 is, for example, about 20 cm, and includes seven antenna elements that are two-dimensionally arranged in a plane. The weight of the array antenna 12 is, for example, about 500 grams. The configuration and size of the array antenna 12 are not limited to this example. The external shape of the array antenna 12 as viewed from above does not need to be a circle, and may be an ellipse, a rectangle, a polygon, a star-shape, or other shapes. The number of antenna elements may be eight or more, or may be in the range of three to six.

The antenna elements according to the example embodiments of the present disclosure are arranged in a plane parallel to the floor F. Specifically, six antenna elements may be arranged concentrically at equal intervals around one antenna element located at the center of the array antenna 12. This arrangement is only an example.

The array antenna 12 may include a high-frequency circuit, such as a monolithic microwave integrated circuit, and an A/D conversion circuit (not shown). Such circuits may be connected between the processing circuit 14 and the array antenna 12 instead of being provided in the array antenna 12.

As described above, in the example embodiments of the present disclosure, the array antenna 12 includes a plurality of antenna elements, and sequentially or simultaneously receives the signal waves respectively emitted from the plurality of beacons 20 and outputs array signals from the antenna elements. The processing circuit 14 reads out the identification information from the received signal waves. Then, the processing circuit 14 refers to the data stored in the storage device 40, and on the basis of the identification information, determines the position of at least one of the beacons 20 that have emitted the signal waves. The processing circuit 14 estimates the arrival directions of the signal waves on the basis of the array signals that have been output from the array antenna 12, and estimates the angles that define the arrival directions of the signal waves. The arrival directions of the signal waves may be referred to as the direction of arrival (DOA) or the angle of arrival (AOA).

The arrival directions of the signal waves estimated by the above method is defined by angles (polar coordinates) with respect to the moving object 10. On the other hand, the positions of the plurality of beacons 20 are known. Therefore, by reading out the identification information from the signal wave, the beacon 20 that has emitted the signal wave including the read identification information can be specified. As described above, the storage device 40 stores data that associates each of the identification information with the position of corresponding one of the beacons 20. The position of each beacon 20 specified by the identification information can be grasped by referring to this data.

FIG. 5 is a perspective view schematically showing the inside of a building, such as a warehouse including a large number of beacons 20 arranged on its ceiling C. FIG. 5 shows three moving objects 10*a*, 10*b*, 10*c* that receive one or a plurality of signal wave emitted from one or a plurality of beacons 20 and travel while measuring the position (localization or positioning). FIG. 5 shows a management device 30 configured to manage operation of the moving objects 10*a*, 10*b*, 10*c*.

FIG. 5 shows the beacons 20 in a large size so that the beacons 20 can be easily recognized. The beacons 20 each may have a small size of, for example, about 1 cm×1 cm. The beacons 20 may be embedded in the ceiling C in a state in which they cannot be visually recognized. Some of the beacons 20 may be mounted on fixed objects, such as walls, windows, and columns. The mounting surface, such as a ceiling, does not need to be flat, and all the beacons 20 do not need to be located in one plane.

In the case where a large number of beacons 20 are arranged in a wide area as shown in FIG. 5, power consumption by the beacons 20 excessively increases if every beacon 20 continues to emit a signal wave. In view of this, the beacons 20 preferably have a function of changing the intervals (time period) of emitting (broadcasting) the signal waves.

The beacons 20 of the present disclosure are configured to periodically or intermittently emit a signal wave including identification information. Each of the beacons 20 includes: a processor; a memory that stores a program configured to control an operation of the processor; a power supply configured to provide power to the processor and the memory; an antenna 24 configured to emit an electromagnetic wave as the signal wave; and a radio wave absorber 220 configured to adjust an emission angle of the signal wave. The beacon 20 is configured to periodically or intermittently emit the signal wave including the identification information in a limited direction. The position estimation according to the present disclosure is performed not on the basis of the strength of the signal wave, but on the basis of the arrival directions of the signal waves and identification information carried by the signal waves emitted by the beacons 20 periodically or intermittently. Therefore, the direction dependency of the strength of the signal waves emitted from the beacons 20 does not matter.

FIG. 6A is a diagram schematically showing a configuration example of each beacon 20 in the example embodiments of the present disclosure. As shown in FIG. 6A, the beacons 20 each include the antenna 24 configured to emit a signal wave, a semiconductor integrated circuit 26 connected to the antenna 24, and a battery 28 configured to operate as a power supply. The antenna 24 is a small antenna and need not be an array antenna. Typical examples of the antenna 24 include ceramic chip antennas, and printed circuit board (PCB) trace antennas. The semiconductor integrated circuit 26 may include a processor, a memory, a high-frequency oscillator circuit, and the like. The illustrated beacons 20 each include a sensor SE, such as an illuminance sensor or a temperature sensor, and a communication module CM. Since the beacons 20 each include the sensor SE and the communication module CM, the beacons 20 can detect the temperature and illuminance of the environment at the position of each individual beacon 20 and transmit a signal wave incorporating information indicative of the output of the sensor SE to the array antenna or the like. Thus, information on temperature distribution, illuminance distribution, or the like in the space where the beacon network is provided can be acquired from the beacon network via the signal waves. That is, in one example embodiment, each of the plurality of beacons 20 includes an illuminance sensor. The signal waves include information indicating the output of the illuminance sensor. Thereby, the illuminance distribution in the space where the beacon network is provided can be acquired from the beacon network via the signal waves. In another example embodiment, each of the plurality of beacons 20 may include a temperature sensor. In this case, the signal waves include information indicating the output of the temperature sensor. Thereby, the temperature distribution in the space where the beacon network is provided can be acquired from the beacon network via the signal waves.

FIG. 6B is a perspective view schematically showing one of the beacons 20 according to the present example embodiment. This beacon 20 includes a substrate 210 on which electronic components, such as the antenna 24 and the semiconductor integrated circuit 26, are mounted, and the radio wave absorber 220 located on the side surfaces and the back surface of the substrate 210. Other electronic components, such as the communication module CM, the illuminance sensor, and the temperature sensor, may be mounted on the substrate 210.

In the illustrated example, the radio wave absorber 220 does not surround the entire side surfaces of the substrate 210, but the configuration of each beacon 20 in the example embodiments of the present disclosure is not limited to this example. The radio wave absorber 220 may surround the entire side surfaces of the substrate 210. Further, the radio wave absorber 220 may be disposed only on the back surface of the substrate 210, or may be disposed on the front surface of the substrate 210. In the case where the radio wave absorber 220 is disposed on the front surface of the substrate 210, the radio wave absorber 220 has at least one opening to allow part of the signal wave emitted from the antenna 24 to pass therethrough.

The radio wave absorber 220 can be formed of various materials, such as any of a conductive material, a dielectric material, and a magnetic material, or a combination thereof. Further, the radio wave absorber 220 may have a flat single-layer structure or a laminated structure, or may have an electromagnetic wave absorbing structure with an uneven surface or a metamaterial structure. The structure and the size of the radio wave absorber 220 can be determined according to, for example, the wavelength of the signal wave. For example, in the case where the outer shape of the radio wave absorber 220 is rectangular, a side of the radio wave absorber 220 may have a length of equal to or greater than the wavelength of the signal wave.

FIG. 6C is a perspective view showing the back surface of the beacon 20 shown in FIG. 6B. Each of the plurality of beacons 20 includes a solar battery 230 serving as a power supply. Each of the beacons 20 in this example includes a solar battery (photovoltaic cell) 230 with a light receiving unit 230P. The solar battery 230 receives light, such as illumination light, through the light receiving unit 230P, and generates power. The power generated by the solar battery 230 serving as a power supply is fed to various circuits mounted on the substrate 210 shown in FIG. 6B. In this example, the radio wave absorber 220 is disposed between the substrate 210 and the solar battery 230, and thus the radio wave absorber 220 located on the back surface of the substrate 210 has an opening or a slit (not shown) for achieving electrical connection between the circuits on the substrate 210 and the solar battery 230. The solar battery 230 may include various photoelectric conversion elements that operate on dye sensitization or other principles. Since the voltage of the solar battery 230 is generally low, the solar battery 230 can be used in combination with a booster circuit, such as a DC-DC converter. Since power consumption of the beacons 20 is low, use of the solar battery 230 configured to generate power utilizing illumination light or natural light, for example, eliminates the need of replacement operation required for a secondary battery, thereby achieving a maintenance-free battery.

The beacons 20 that include the solar battery 230 on the back surface of the substrate 210 may be fixed to, for example, a position away from the ceiling, e.g., bars, nets, pillars, and/or shelves provided at positions below the lighting equipment so that light is incident on the light receiving unit 230P of the solar battery 230. The solar battery 230 may be disposed on the front side or a side surface of the substrate 210, or may be fixed to the radio wave absorber 220 located on a side surface of substrate 210.

FIG. 6D is a perspective view schematically showing a large number of beacons 20 arranged on a ceiling. Each of the plurality of beacons 20 has the radio wave absorber 220. The floor surface is irradiated with the signal wave emitted from each of the beacons 20 at an emission angle adjusted by the radio wave absorber 220. The figure shows signal-wave emission from two beacons 20. The emission angle 20α is adjusted by the radio wave absorber 220 described above with reference to FIGS. 6B and 6C. In the example of FIG. 6D, the floor surface is irradiated with the signal waves emitted from two of the beacons 20 at the individual emission angles 20α adjusted by the individual radio wave absorbers 220. Since the floor surface is irradiated with the signal waves, the signal waves emitted from the beacons 20 reach the moving object 10 when the position of the moving object 10 traveling on the floor surface is to be measured. Irradiation areas 240 of two adjacent beacons 20 partially overlaps at least in a space or on a plane where the array antenna 12 moves. The emission angle 20α is, for example, 60 degrees or less.

The plurality of beacons 20 are arranged such that signal waves emitted from at least two beacons 20 can reach the array antenna 12 of the moving object 10 subjected to positioning. This means that the array antenna 12 of the moving object 10 can receive signal waves from a plurality of directions at any position on a traveling path. Note that there is no need for the signal waves emitted from one or more beacons 20 to reach an area where the moving object 10 does not travel at all.

FIG. 6E is a plan view schematically showing an arrangement of the irradiation areas 240 of the signal waves according to an example of the beacon network. This plan view shows the irradiation areas on a plane where the array antenna 12 moves according to traveling of the moving object 10. In this example, the moving object 10 can travel along a path 245 indicated by the broken line in the figure. When the traveling route of the moving object 10 is limited like this, a beacon network is provided so as to form the irradiation areas 240 that enable positioning of the moving object 10 to be performed on the path 245 or around the path 245. The shape and size of the irradiation area 240 formed by each beacon 20 can be determined according to the environment. In the case where an object that may reflect the signal waves exists near the path 245 of the moving object 10, the irradiation areas 240 desirably have a shape and size avoiding the object. In the example of FIG. 6E, the irradiation areas 240 formed by the beacons 20 are oval or circular, but the shapes of the irradiation areas 240 may be rectangular or other shapes. In the case where the moving object 10 can travel to freely-selected position within a wide range, the beacons 20 forming the beacon network can be arranged simply and at regular intervals, for example, as shown in FIG. 6D.

According to the present example embodiment, the radio wave absorber 220 shown in FIGS. 6B and 6C allows the irradiation areas 240 to have a long-axis shape extending relatively longer in one direction, as shown in FIG. 6D. The irradiation area 240 of each signal wave can be adjusted by the radio wave absorber 220 provided in each beacon 20, thereby suppressing unnecessary reflection of the signal waves.

FIG. 6F is a diagram schematically showing an arrangement of the radio wave absorbers 220 according to an example of the beacon network. In the example shown in FIG. 6F, each beacon 20 fixed to the ceiling C includes the radio wave absorber 220. The signal waves are emitted from the beacons 20 at the emission angles adjusted by the radio wave absorbers 220 of the beacons 20, and travel downward from the ceiling. That is, each of the plurality of beacons 20 has the radio wave absorber 220. The signal wave emitted from each beacon 20 at the emission angle adjusted by the radio wave absorber 220 travels downward from the ceiling C. The signal wave whose emission angle is adjusted by the radio wave absorber 220 travels downward from the ceiling, which enables the area where the moving object 10 travels to be efficiently irradiated. The beacon 20 located near the wall has another radio wave absorber 220 between the beacon 20 and the wall so as not to emit the signal wave toward the wall. This radio wave absorber 220 adjusts the signal wave emitted from the beacon 20 to travel in a direction inclined with respect to the vertical direction.

One or more radio wave absorbers 220 included in the beacon network may be fixed at a position away from the beacons 20. For example, a radio wave absorber 220 may be provided on the surface of a wall, another fixed object, or a moving body. Alternatively, the beacon network may include another radio wave absorber 220 arranged at a predetermined position. The other radio wave absorber 220 suppresses reflection of the signal waves emitted from the plurality of beacons 20. This suppresses occurrence of an error caused by receiving a reflected signal wave during positioning.

Each of the plurality of beacons 20 is configured to operate both in a first mode in which the signal wave is emitted at a first time-interval, and in a second mode in which the signal wave is emitted at a second time-interval that is shorter than the first time-interval. Each of the plurality of beacons 20 may have a light source 22 that emits visible light when operating in the second mode.

The plurality of beacons 20 are detachably attached to predetermined positions of which coordinates are known. A beacon 20 of which supply voltage of the battery 28 has dropped due to long-term use can be removed from the predetermined position and replaced by a new beacon 20. Only the battery 28 of the beacon 20 may be replaced with a new battery.

The beacons 20 may be respectively attached to, for example, a plurality pieces of lighting equipment arranged on the ceiling. Each of the lighting equipment has a lighting circuit configured to receive power from a lamp line or the like. The beacons 20 each may be fed from such a lighting circuit. Since the power consumption of the beacons 20 is low, the beacons 20 each may employ as its power supply an element, such as a small-sized solar cell, configured to convert light emitted from the light source of the lighting equipment into electric power, instead of the battery 28.

FIG. 7A is a waveform diagram schematically showing a signal wave emitted at first time-intervals T1 from the beacons 20 operating in a first mode. A plurality of rectangular portions pointed by the arrows indicate the periods during which the signal waves are emitted. Each of the first time-intervals T1 can be set to, for example, 5 seconds or more.

FIG. 7B is a waveform diagram schematically showing a signal wave emitted at second time-intervals T2 from the beacons 20 operating in a second mode. A plurality of rectangular portions pointed by the arrows indicate the periods during which the signal waves are emitted. Each of the second time-intervals T2 can be set to 1 second or less, for example, 500 milliseconds.

The beacons 20 normally operates in the first mode. However, the operation can be switched from the first mode to the second mode when the moving object 10 approaches, for example. Various configurations can be employed to detect that the moving object 10 has approached. According to an example, the moving object 10 that has detected a specific beacon 20 transmits a request signal wave (a request) to the detected beacon 20. Specifically, the moving object 10 can determine whether the number of at least one beacon 20 that has emitted the signal wave is singular or plural by reading the identification information from the received signal wave. When a single beacon 20 has emitted the signal wave, the request signal wave is transmitted to this single beacon 20. On the other hand, when a plurality of the beacons 20 have emitted the signal waves, the request signal wave is transmitted to some beacons 20 selected from this plurality of beacons 20. The request signal may be typically sent to the beacon 20 closest to the current position of the moving object 10. When receiving the request signal wave while operating in the first mode, the beacons 20 each switches from the first mode to the second mode. This suppresses inefficient power consumption caused by emission of the signal waves. As a result, the life of the battery 28 is extended. When complying with the Bluetooth (registered trademark) Low Energy standard, the beacons 20 each can operate as an advertiser and the moving object 10 with the array antenna 12 can operate as a scanner. As described above, the signal waves emitted by the beacons 20 can transmit identification information and the like to the moving object 10 in the form of an advertising packet.

In the example of FIG. 2, the beacons 20 emitting the signal waves W3, W4, and W5 operate in the first mode, and the beacons 20 emitting the signal waves W1 and W2 operate in the second mode. The beacons 20 operating in the first mode are located farther from the moving object 10 than the beacons 20 operating in the second mode.

As described above, the arrival direction of the received signal wave can be estimated as a result of the operation of the array antenna 12 and the processing circuit 14. However, the arrival direction of the signal wave is the direction of the beacon 20 that has emitted the received signal wave with respect to the moving object 10. Hereinafter, an example of a method of determining the position and the posture of the moving object 10 on the basis of the arrival direction of the signal wave emitted by the beacon 20 will be described.

The following description refers to FIGS. 8 and 9. FIG. 8 is a perspective view schematically showing a region C in which the array antenna 12 estimates the arrival direction with relatively high accuracy. FIG. 9 is a plan view schematically showing the region C.

The region C in which the array antenna 12 estimates an arrival direction with relatively high accuracy is defined by a cone having the region C as a base. The height H of the cone corresponds to the distance from the array antenna 12 to the surface on which the beacons 20 are arranged. The center of the array antenna 12 is located at the vertex of the cone, and the apex angle of the cone corresponds to the angle of field or the angle of view of the array antenna 12. The size of the cone depends on the sensitivity and directivity of the array antenna 12, the power and directivity of signal-wave emission of the beacons 20, and the shape, size, arrangement, and the like of the radio wave absorbers 220.

The moving object 10 is capable of communicating with a large number of beacons 20 located outside this cone. However, the estimation accuracy of the arrival direction of the received signal wave tends to decrease as the distance from the cone increases. It is preferable to use the beacons 20 located inside the region C so as to perform positioning (position estimation) with high accuracy.

In the examples shown in FIGS. 8 and 9, the arrival direction D of the signal wave emitted from the beacon 20X is specified by the angle $\alpha$ and the angle $\beta$. FIG. 8 shows the w-axis of local coordinates (moving-object coordinates) unique to the moving object 10, and FIG. 9 shows the u-axis and the v-axis of the local coordinates. The uv-plane is parallel to the floor. The w-axis is parallel to the vertical direction (height direction). The u-axis, v-axis, and w-axis are orthogonal to one another and constitute the right-handed uvw-coordinates. On the other hand, the coordinates unique to a building, such as a warehouse, are right-handed XYZ coordinates composed of mutually orthogonal X-axis, Y-axis, and Z-axis. The XYZ coordinates are global coordinates that do not depend on the position and posture (orientation) of each moving object 10.

As shown in FIG. 8, the angle α is an angle between the arrival direction D and the w-axis. On the other hand, the angle β is an angle (azimuth) between a line segment formed by projecting the arrival direction D perpendicularly to the u-v plane and the u-axis, as shown in FIG. 9. Here, when the orientation of the moving object 10 is unknown, the angle between the X-axis of the global coordinates and the u-axis of the moving-object coordinates is unknown.

As described above, the position coordinates of the beacon 20X are obtained on the basis of the identification information included in the signal wave. In addition, the arrival direction (estimated values of the angle α and the angle β) of the signal wave from the beacon 20X is obtained by the array signal processing. However, the estimated values of the angle α and the angle β are values with reference to the moving object 10, and thus the position coordinates of the moving object 10 on the global coordinates cannot be determined unless the orientation of the moving object 10 is determined.

FIG. 10 is a diagram schematically showing a circumference P1 in which the moving object 10 may exist when the angle α of the arrival direction is 40° in the case where the orientation of the moving object 10 is unspecified. On the other hand, FIG. 11 is a diagram schematically showing a circumference P2 in which the moving object 10 may exist when the angle α of the arrival direction is 20° in the case where the orientation of the moving object 10 is unspecified. As can be seen from FIGS. 10 and 11, the smaller the angle α is, the smaller the area in which the moving object 10 may exist. When the orientation of the moving object 10 is known, the position of the moving object 10 can be specified to one point in the circumference P1 or P2.

In the case where the moving object 10 receives one signal wave and there is only one beacon 20 ahead of the arrival direction of the one signal wave, the position of the moving object 10 is unspecified if the orientation of the moving object 10 is unknown as described above. However, the position and the orientation of the moving object 10 can be calculated on the basis of the coordinates of the plurality of (preferably three or more) beacons 20 if the arrival directions of the signal waves from those beacons 20 can be estimated. That is, for example, the moving object 10 exists at a point of intersection of the circumference P1 on the bottom surface of the cone having the beacon 20X as the vertex illustrated in FIG. 10 and a circumference of the bottom surface of a cone having any of the other beacons 20 as the vertex. This makes it possible to estimate not only the position but also the posture (angle) of the moving object 10. Therefore, it is preferable that the arrangement of the beacons 20 is determined such that the region C (see FIGS. 8 and 9) always includes a plurality of beacons 20. However, the position of the moving object 10 can be specified when the previous orientation of the moving object 10 is known and the orientation can be assumed to be maintained during traveling, even if the number of beacons 20 included in the region C may become temporarily one during traveling of the moving object 10. In the same manner, the processing circuit 14 determines the posture of the moving object 10 on the basis of the position of at least one beacon 20 that has emitted the signal wave and the estimated arrival direction of the signal wave. Accordingly, if the travel history of the moving object 10 is known, the position coordinates of the moving object 10 on the global coordinates can be determined when the posture of the moving object 10 is calculated.

The description refers to FIG. 12. In FIG. 12, the beacons 20 are arranged at a relatively low density as compared with those in FIG. 9. The origin of the uv-plane of the moving-object coordinates moves on the XY-plane of the global coordinates, and thus the origin of the uv-plane does not necessarily coincide with the origin of the XY-plane. However, FIG. 12 schematically shows a state in which both of the origins coincide with each other, and shows an angle Θ indicating rotation of the u-axis with respect to the X-axis.

As described above, even when the angles α and β indicating the arrival direction with respect to a given beacon 20 are obtained, the position of the origin on the uv-plane (the position of the moving object) cannot be determined around the beacon 20 (the region in which the beacon 20 can be seen at the angle α) if the orientation of the moving object 10, i.e., the angle Θ is unknown.

FIG. 12 shows a first region C1 corresponding to the region C shown in FIG. 9, and a second region C2 that is larger than the first region C1. The accuracy of estimation of the arrival direction is relatively low with respect to the beacons 20 located in the second region C2 as compared with the beacon 20 located in the first region C1. However, the position and the orientation of the moving object 10 can be estimated by using the signal waves from the beacons 20 located in the second region C2 in addition to the signal wave from the beacon 20 located in the first region C1. Outside the first region C1, the estimation accuracy with respect to the angle β, which is the azimuth, is higher than with respect to the angle α. Accordingly, the information on the angle β is relatively high in accuracy even when a signal wave from the beacon 20 located farther is used, which makes it possible to obtain useful information in determining the orientation of the moving object 10.

FIGS. 13A and 13B schematically show a state in which operation of the beacons 20 is switched from the first mode to the second mode according to movement of the moving object 10. In these figures, the beacons 20 operating in the first mode are indicated by white rectangles, and the beacons 20a operating in the second mode are indicated by hatched rectangles. The beacons 20a operating in the second mode are selected along a planned route of the moving object 10. The moving object 10 can distinguish the beacons 20a operating in the second mode from the beacons 20 operating in the first mode by measuring the time intervals of receiving the signal waves. By detecting the beacons 20a operating in the second mode, the moving object 10 can recognize the route to travel (the traveling direction).

The above operation can be achieved by the system using a traveling management device 30 for the moving object 10. In one example embodiment, the moving-object positioning system includes the traveling management device 30. The traveling management device 30 wirelessly communicate with the plurality of beacons 20, and switches the operation of one or more of the beacons 20 selected from the plurality of beacons 20 from the first mode to the second mode. The traveling management device 30 sequentially switches the operation of the plurality of beacons 20 from the first mode to the second mode along the traveling route of the moving object 10. Further, the moving object 10 travels so as to approach the beacons 20a operating in the second mode.

The traveling management device 30 can obtain the self-position information, which has been calculated by the moving object 10 through the array signal processing, from the moving object 10 by wireless communication, and can track the position of the moving object 10.

In the above example embodiments, the moving object 10 performs the arithmetic processing for positioning. The moving-object positioning system of the present disclosure is not limited to this example. In another example embodiment, not the moving object 10 but the management device 30 executes an arithmetic processing for determining the position of the moving object 10. The moving-object positioning system according to such an example embodiment also includes the moving object 10 and the plurality of beacons 20 described above. The moving-object positioning system includes a management device 30 having a storage device 40 configured to store data that associates the identification information with the position of each of the beacons 20, and the management device 30 is configured to communicate with the moving object 10 through a communication module. The management device 30 acquires the estimated arrival direction of the signal wave and the identification information from the moving object 10 through the communication module. Then, the management device 30 refers to the data stored in the storage device 40. Further, the position of at least one beacon 20 that has emitted the signal wave is determined on the basis of the identification information. Further, the management device 30 can estimate the position of the moving object 10 on the basis of the position of at least one beacon 20 that has emitted the signal wave and the arrival direction of the signal wave.

The present disclosure also relates to a logistics management system including the various moving-object positioning systems described above. The logistics management system includes a sensing device 55 configured to detect that a package carried by the moving object 10 has been unloaded from the moving object 10. More specifically, the logistics management system of the present disclosure includes: the moving-object positioning system; the sensing device 55 configured to detect that a package carried by the moving object 10 has been unloaded from the moving object 10; and a package-position management device 50 configured to store the position of the package unloaded from the moving object 10 based on a position of the moving object 10 measured by the moving-object positioning system and an output of the sensing device 55. The sensing device 55 may be a mobile terminal carried by an operator who drives the moving object 10. Further, the sensing device 55 may be a weight sensor attached to the moving object 10. For example, in the case where the sensing device 55 is a mobile terminal having a touch screen, the operator operates the touch screen and inputs the number or the like assigned to the unloaded package to the sensing device 55. The logistics management system includes: the package-position management device 50 configured to store the position of the package unloaded from the moving object 10 on the basis of the position of the moving object 10 measured by the moving-object positioning system and the output of the sensing device 55. This configuration makes it possible to manage the position of the package carried by the moving object 10.

FIG. 14 is a diagram schematically showing a layout of a warehouse for illustrating an example embodiment of a logistics management system according to the present disclosure. In this example, N×M beacons 20 (N and M are both positive integers) are arranged on the ceiling of the warehouse at regular intervals in N rows and M columns. In FIG. 14, reference signs (i, j) are assigned to the beacons 20 located in the i-th row and the j-th column (i and j are integers satisfying 1≤i≤N and 1≤j≤M) so as to distinguish the individual beacons 20.

The moving object 10 in this example is a manned carrier trolley. The moving object 10 travels into the warehouse in a state the sensing device 55 is mounted thereon. The moving object 10 is steered by a user (operator or driver) riding on the moving object 10. The moving object 10 travels on a route indicated by the broken line in the figure. The route is not limited to the illustrated example, and may have a more complicated pattern. The user unloads a package 60 and a package 62 at different points on the route. When unloading the packages, the user operates the sensing device 55 to indicate that the packages have been unloaded. In this example embodiment, the sensing device 55 is configured to detect that a package has been unloaded from the moving object 10 according to an input operation by a user, and transmit an output to the package-position management device 50 by wireless communication. The output here is an output by the sensing device 55. In this manner, the package-position management device 50 can store unloading of the package in association with the current position of the moving object 10. In this configuration, since the user performs an input operation to the sensing device 55, it is possible to manage the packages according to actions appropriate to the practical situation, such as unloading or moving of a plurality of packages to different positions. The position of the moving object 10 can be obtained on the basis of the tracking of the moving object 10 performed by the above-described moving-object positioning system. Further, positioning of the moving object 10 by the moving-object positioning system may be performed when the sensing device 55 receives an input operation by an operator. Further, for example, positioning may be performed when the sensing device 55 detects unloading of a package from the moving object 10.

A person who steers the moving object 10 need not know a traveling route of the moving object 10 in advance, and may unload a package onto an appropriate empty space while running the moving object 10 in the warehouse.

The package-position management device 50 may also serve as the traveling management device 30 of the moving object 10. In this case, the package-position management device 50 determines an appropriate traveling route, and then switches operation of the beacons 20 along the traveling route from the first mode to the second mode in order to let the operator know the position for placing a package. When the light sources 22 of the beacons 20 operating in the second mode emit visible light, the person who steers the moving object 10 can run the moving object 10 along the running route with reference to the lighting state of the light sources 22.

In some cases, accurate position coordinates may not be necessary for the position of the traveling moving object 10 or the position for unloading a package. In such a case, indication of a divided area among a plurality of divided areas, which are respectively assigned to the beacons 20, is sufficient as the "position".

FIG. 15 is a diagram illustrating another example embodiment of the logistics management system according to the present disclosure. FIG. 15 shows a plurality of divided areas 70 respectively assigned to the beacons 20. The divided areas 70 are divided by dashed-dotted boundary lines 200 extending vertically and horizontally. The boundary lines 200 are imaginary lines, and need not be drawn actually on the ceiling or the floor of the building.

In the example of FIG. 15, the package 60 is placed in one of the divided areas 70 that is allocated to one of the beacons 20 having the identification number of ID21. On the other hand, the package 62 is placed in another one of the divided areas 70 that is allocated to one of the beacons 20 having the identification number of ID 38.

In this manner, the positions of the packages 60, 62 in the present example embodiment are indicated by the divided areas, not by the values of the specific global coordinates. As described above, the moving-object positioning system of the present disclosure can detect identification information that is unique to the beacon 20 closest to the position where the moving object 10 is unloaded. With the identification information, the position where the package is placed can be specified by the divided area. The beacon 20 closest to the moving object 10 is a beacon 20 of which angle α (see FIG. 8) indicating the arrival direction is the smallest with respect to the array antenna 12 that has received the signal wave.

In this case, the orientation of the moving object 10 (the angle Θ in FIG. 12) need not be recognized. Therefore, estimation of the arrival direction of the signal wave (especially, the angle α) facilitates identification of the beacon 20 located closest to the moving object 10.

FIG. 16 is a diagram illustrating still another example embodiment of the logistics management system according to the present disclosure. In this example, arrangement of the beacons 20 does not have fixed intervals. The divided areas 70 may be defined according to the area where the packages are to be placed, and thus the beacons 20 may be arranged at positions corresponding to, for example, the centers of the divided areas 70 having different sizes.

In the above example embodiments, all the beacons 20 forming the beacon network are fixed at predetermined positions. The array antenna 12 of the moving object 10 can estimate its own position by detecting the azimuths of the signal waves from the beacons 20 whose positions are known. On the other hand, the array antenna 12 of the moving object 10 whose own position has been determined in this way can also receive a signal wave from another beacon (mobile beacon) that is movable and can change its position. If the position of the moving object 10 has been estimated, the position of the mobile beacon itself can be estimated by obtaining the estimated azimuth of the mobile beacon with respect to the moving object 10.

FIG. 17 is a schematic diagram for illustrating yet another example embodiment of the logistics management system according to the present disclosure. In the example shown in FIG. 17, the moving object 10 includes a lift equipment 150 configured to move vertically, and a beacon 20 that moves according to movement of the lift equipment 150. The position of the moving object 10 is obtained on the basis of signal waves from beacons 20 that are fixed at predetermined positions. On the other hand, the height of the beacon 20 mounted on a movable portion of the lift equipment 150 is determined by executing the array signal processing when the array antenna 12 receives a signal wave from this beacon 20. In this manner, the array antenna 12 provided with the moving object 10 may be used for positioning a mobile beacon, or may estimate the position or height of a movable object to which a mobile beacon is attached.

Each of the beacons 20 shown in FIG. 17 includes the solar battery 230 (not shown) oriented in a direction to receive the illumination light. By orienting the solar battery 230 in a direction to receive the illumination light, it is possible to efficiently generate power and supply the power to the beacons 20. The solar battery 230 is disposed between the radio wave absorber 220 and lighting equipment (not shown).

The beacon network and the moving-object positioning system of the present disclosure are suitably used for, for example, positioning the moving object 10 indoors. In addition, they can be used for positioning the moving object 10 even outdoors by appropriately arranging the beacons 20. Further, they be suitably used for transportation and position management of parts, finished products, packages, and the like in a logistics warehouse, a factory, a hospital, an airport, and the like.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A moving-object positioning system comprising:
   a beacon network including:
      a plurality of beacons arranged at predetermined positions to periodically or intermittently emit a signal wave including identification information; and
      a radio wave absorber to adjust an emission angle of the signal wave emitted from at least one of the plurality of beacons;
   a moving object including an array antenna and a processing circuit; and
   a storage device to store data that associates the identification information with a position of each of the plurality of beacons; wherein
   the array antenna includes a plurality of antenna elements to sequentially or simultaneously receive signal waves emitted from the plurality of beacons included in the beacon network, and output array signals from the plurality of antenna elements; and
   the processing circuit is operable to:
      read out the identification information from the signal waves thus received;
      refer to the data stored in the storage device, and determines the position of at least one of the plurality of beacons that have emitted the signal waves based on the identification information;
      estimate arrival directions of the signal waves thus received based on the array signals; and
      perform positioning of the moving object based on the position of the at least one of the plurality of beacons that have emitted the signal waves and the arrival directions of the signal waves thus estimated.

2. The moving-object positioning system according to claim 1, further comprising:
   another radio wave absorber at a predetermined position to suppress reflection of the signal wave emitted from each of the plurality of beacons.

3. The moving-object positioning system according to claim 1, wherein the plurality of beacons are arranged at grid-point positions of a grid pattern extending along a plane parallel to a floor surface.

4. The moving-object positioning system according to claim 3, wherein
   each of the plurality of beacons includes the radio wave absorber; and
   the floor surface is irradiated with the signal wave emitted from each of the plurality of beacons at the emission angle adjusted by the radio wave absorber.

5. The moving-object positioning system according to claim 1, wherein the plurality of beacons are arranged on a ceiling of a building.

6. The moving-object positioning system according to claim 5, wherein
   each of the plurality of beacons includes the radio wave absorber; and the signal wave emitted from each of the plurality of beacons at the emission angle adjusted by the radio wave absorber travels downward from the ceiling.

7. The moving-object positioning system according to claim 1, wherein each of the plurality of beacons includes a solar battery defining a power supply.

8. The moving-object positioning system according to claim 7, wherein each of the plurality of beacons is oriented in a direction that allows the solar battery to receive illumination light.

9. The moving-object positioning system according to claim 7, wherein
each of the plurality of beacons includes an illuminance sensor; and
the signal wave includes information indicating an output of the illuminance sensor.

10. The moving-object positioning system according to claim 1, wherein
each of the plurality of beacons includes a temperature sensor; and
the signal wave includes information indicating an output of the temperature sensor.

11. The moving-object positioning system according to claim 1, wherein the plurality of beacons and the moving object each include a communication module to communicate in accordance with a near field communication protocol.

12. The moving-object positioning system according to claim 1, wherein the processing circuit is operable to determines a posture of the moving object based on the position of the at least one of the plurality of beacons that have emitted the signal wave and the arrival directions of the signal waves thus estimated.

13. The moving-object positioning system according to claim 1, wherein each of the plurality of beacons is operable in a first mode in which the signal wave is emitted at a first time-interval, and in a second mode in which the signal wave is emitted at a second time-interval that is shorter than the first time-interval.

14. The moving-object positioning system according to claim 1, wherein the plurality of beacons are positioned to allow the signal waves emitted from at least two of the plurality of beacons to arrive at the array antenna of the moving object when performing positioning of the moving object.

15. A logistics management system comprising:
the moving-object positioning system according to claim 1;
a sensor to detect that a package carried by the moving object has been unloaded from the moving object; and
a package-position management device to store a position of the package unloaded from the moving object based on the position of the moving object measured by the moving-object positioning system and an output of the sensor.

16. The logistics management system according to claim 15, wherein the sensor is operable to detect that the package has been unloaded from the moving object according to an input operation by a user, and transmit the output to the package-position management device by wireless communication.

17. The moving-object positioning system of claim 1, further comprising
a beacon to periodically or intermittently emit a signal wave including identification information, the beacon including:
a processor;
a memory that stores a program to control an operation of the processor;
a power supply to provide power to the processor and the memory;
an antenna to emit an electromagnetic wave as the signal wave; and
a radio wave absorber to adjust an emission angle of the signal wave.

* * * * *